United States Patent
Pon et al.

[11] Patent Number: 5,923,703
[45] Date of Patent: Jul. 13, 1999

[54] VARIABLE SUPPRESSION OF MULTIPATH SIGNAL EFFECTS

[76] Inventors: Rayman Pon, 1451 Poppy Way; Kreg Martin, 19161 Cozette Ln., both of Cupertino, Calif. 95014; Dominic Farmer, 1807 Golden Hills Dr., Milpitas, Calif. 95035

[21] Appl. No.: 09/138,767

[22] Filed: Aug. 24, 1998

Related U.S. Application Data

[62] Division of application No. 08/650,338, May 20, 1996.

[51] Int. Cl.$^6$ .............................. H04K 1/00; H04L 25/08
[52] U.S. Cl. ........................................... 375/209; 375/346
[58] Field of Search ..................... 375/208, 209, 375/343, 346, 285, 267, 347

[56] References Cited

U.S. PATENT DOCUMENTS

| | | | |
|---|---|---|---|
| 4,007,330 | 2/1977 | Winters | 375/330 |
| 4,168,529 | 9/1979 | Tomlinson | 364/715.11 |
| 4,203,070 | 5/1980 | Bowles et al. | 375/317 |
| 4,203,071 | 5/1980 | Bowles et al. | 375/343 |
| 4,608,569 | 8/1986 | Dickey, Jr. et al. | 342/384 |
| 4,660,164 | 4/1987 | Liebowitz | 364/728.03 |
| 4,862,478 | 8/1989 | McIntosh | 375/200 |
| 5,091,918 | 2/1992 | Wales | 375/11 |
| 5,101,416 | 3/1992 | Fenton et al. | 375/1 |
| 5,164,959 | 11/1992 | Cai et al. | 375/1 |
| 5,282,228 | 1/1994 | Scott et al. | 375/344 |
| 5,390,207 | 2/1995 | Fenton et al. | 375/1 |
| 5,402,450 | 3/1995 | Lennen | 375/343 |
| 5,444,451 | 8/1995 | Johnson et al. | 342/453 |
| 5,481,503 | 1/1996 | Kuhn et al. | 367/100 |
| 5,488,662 | 1/1996 | Fox et al. | 380/34 |
| 5,493,588 | 2/1996 | Lennen | 375/343 |
| 5,495,499 | 2/1996 | Fenton et al. | 375/205 |

OTHER PUBLICATIONS

R. E. Ziemer & R. L. Peterson, *Digital Communications and Spread Spectrum Systems,* MacMillan Publishing Company, New York 1985, pp. 149–447.

Alfred Leick, *GPS Satellite Surveying,* John Wiley & Son, New York, 2nd Edition, 1995, and Ziemer and Peterson, op. cit.

W. M. Bowes, "Correlation Tracking," Charles Stark Draper Laboratory, May 1980.

*Primary Examiner*—Tesfaldet Bocure
*Attorney, Agent, or Firm*—Wagner, Murabito & Hao

[57] ABSTRACT

Method and apparatus for formation of an autocorrelation difference function of an incoming digital signal that reduces the effects of presence of a multipath signal or of noise in an incoming digital composite signal. An incoming digital composite signal, including direct and multipath signals, is received that has a bit value transition interval of length $\Delta\tau_{chip}$. Two or three consecutive bit values $b_{n-2}$, $b_{n-1}$ and $b_n$ of the direct (ideal) signal are examined. If a test condition for these bit values is satisfied, a first non-uniform weighting function w1(t) is used to compute the contribution of a time interval $I_n = \{t' | t_{n-1} + \Delta < t' \leq t_n + \Delta\}$, where $\Delta$ is a selected time value satisfying $0 \leq \Delta < \Delta\tau_{chip}$, to first and second autocorrelation functions AC#($\tau$;E) and AC#($\tau$;L) with respective selected first and second time shifts $\tau = t_E$ and $\tau = t_{L\ (>tE)}$. If the test condition is not satisfied, a second weighting function w1^(t) is used to compute the contribution of the time interval $I_n$ to AC#($\tau$;E) and AC#($\tau$;L). An autocorrelation difference function $\Delta$AC#($\tau$)=AC#($\tau$;E) and AC#($\tau$;L) is formed in which the effects of noise or of multipath signals is suppressed, relative these effects in a conventionally computed autocorrelation difference function $\Delta$AC($\tau$)=AC($\tau$;E)–AC($\tau$;L).

18 Claims, 24 Drawing Sheets

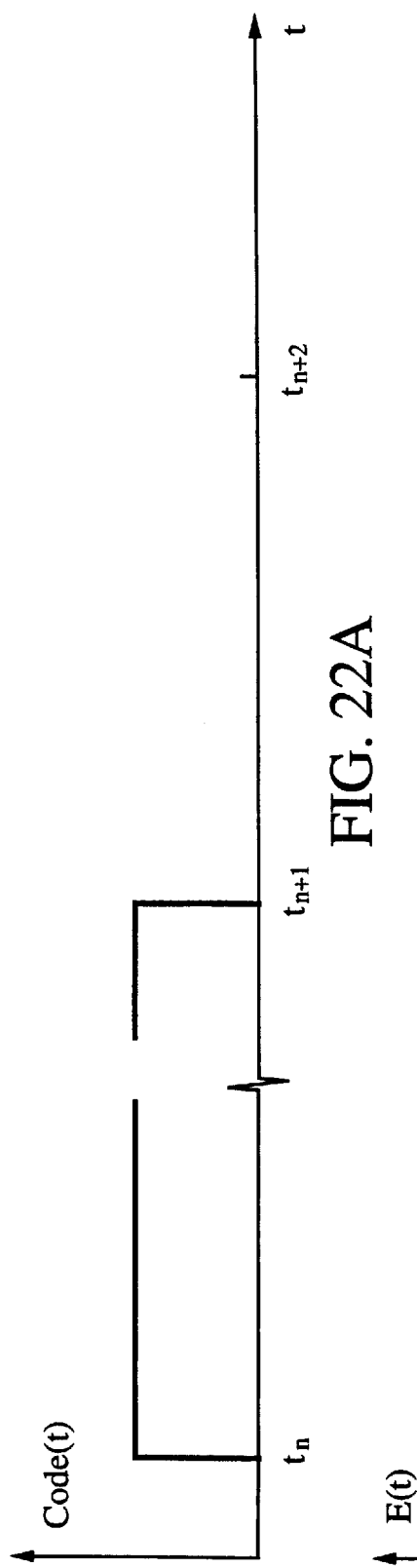
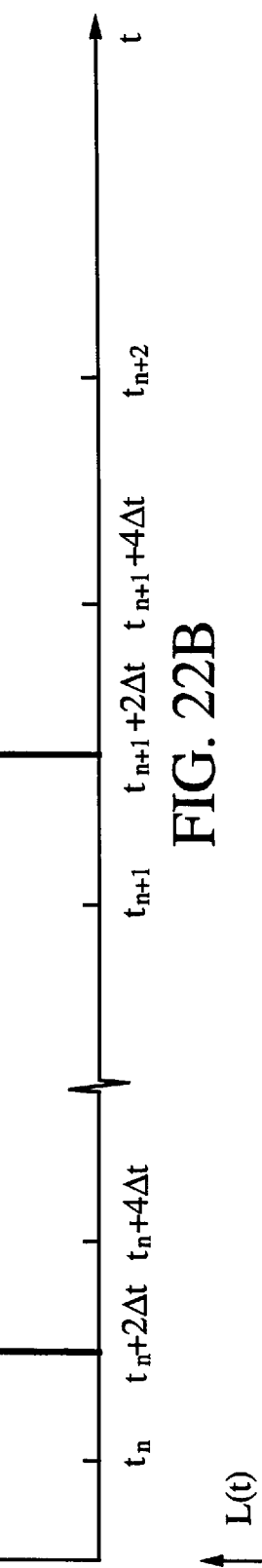
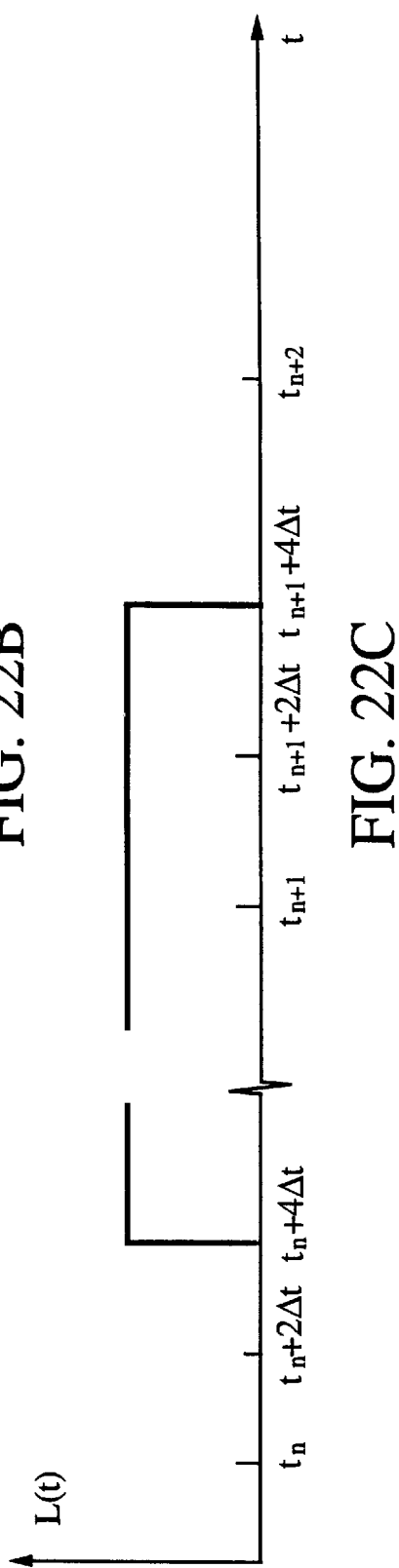
FIG. 22A
FIG. 22B
FIG. 22C

VARIABLE SUPPRESSION OF MULTIPATH SIGNAL EFFECTS

This application is a divisional of 08/650,338 filed May 20, 1996.

FIELD OF THE INVENTION

This invention relates to a method for minimizing the deleterious effects of multipath on incoming digital spread spectrum signals that are encountered in signal receivers, using analysis of transitions of consecutive bit values in the incoming signal.

BACKGROUND OF THE INVENTION

The effects of multipath are well known in communications systems. Multipath is the term used to define the secondary signals that are locally induced reflections of a primary signal that enter the receiver in question a fraction of a second later than the direct path signal, and because of the relatively short delay between the original signal and the secondary signal, induce a type of destructive interference that results in some type of impairment to the desired signal. In analog FM band automobile receivers, the effects of multipath create an annoying flutter that causes a loss of intelligibility. In television signals, the impairment is called a "ghost" image. A similar impairment occurs in other forms of analog communication. In digital systems, whether for speech or for data transmission for other purposes, multipath basically adds noise to the desired signal, resulting in either outright errors or at least, much noisier data. In spread spectrum receivers, the effects of multipath are generally found in the correlators used to achieve signal timing synchronization. In GPS or GLONASS receivers, which seek to determine location based on triangulation of range distances determined from time delay measurements made from an orbiting constellation of satellites, the effect of multipath is to induce comparatively large instantaneous errors in the time of arrival measurements which translate into large errors in the indicated positions. Removal of these errors is the subject of most of the work done by previous workers in this field. Previous researchers have sought to deal with the effects of multipath by attempting to estimate the magnitude of the error introduced, and to subtract this error or to otherwise compensate for its effects.

The methods employed to acquire and demodulate data from spread spectrum transmissions is well known in the art. See R. E. Ziemer and R. L. Peterson, *Digital Communications and Spread Spectrum Systems,* Macmillan Publ Co., New York, 1985, pp. 419–447 for a discussion of acquisition and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on GPS, such as Alfred Leick, *GPS Satellite Surveying,* John Wiley & Sons, New York, Second Edition, 1995, and Ziemer and Peterson, op cit.

A GPS signal contains a 50 bit/second navigation message and a unique spreading code (C/A) of length 1.023 kilobits, which is transmitted at a frequency of about 1.023 Mbits/sec. Signal acquisition requires that phase lock first occur with the radio frequency carrier and that the reference or local replica signal be synchronized with the spreading code. In signal synchronization, a local replica of the particular satellite code is synchronized in time with the incoming satellite signal code.

Once the Doppler error in the downlink signal from the satellite is appropriately compensated for and signal synchronization is obtained, the navigation message in the 50 bit/second modulation that forms the composite GPS signal (direct plus multipath) can be demodulated. This navigation message contains data on the satellite ephemerides and time pulses that indicate when the transmission originated from the satellite. By measuring the difference between the local clock time and the indicated satellite time of transmission, the time delay, and thus the instantaneous distance from GPS receiver to satellite, can be obtained by multiplying this time delay by the speed of light in the ambient medium.

Signal synchronization is performed using a signal correlator. The correlator constantly compares the incoming signal with a local replica of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as an autocorrelation function. A variety of autocorrelation functions $AC(\tau)$ are shown in various texts, and an example is shown in FIG. 1A. An autocorrelation function $AC(\tau)$ can be described according to one of the equations $$AC(\tau) = \int_o^T s(t')S_d(t' + \tau)dt' \quad (1A)$$

or $$AC(\tau) = \sum_{k=1}^{K} s(t_k)S_d(t_k + \tau), \quad (1B)$$

depending upon whether integration or summation of sampled values over a suitable contribution time interval is used to compute the composite signal autocorrelation function. The length T of the contribution time interval used to compute the autocorrelation function in Eq. (1A) or (1B) is often chosen to be N times the chip length $\Delta\tau_{chip}$, where N is a large positive number.

Tracking the composite satellite signal requires maintaining signal synchronization. The peak of the autocorrelation function is rounded, not pointed, due to finite bandwidth effects, so that locating a true peak is difficult. Receiver designers have, therefore, resorted to an "early-minuslate" correlation tracking method, as discussed by W. M. Bowles in "Correlation Tracking," Charles Stark Draper Laboratory, May 1980, by Fenton et al in U.S. Pat. No. 5,101,416, and by Lennen in U.S. Pat. Nos. 5,402,450 and 5,493,588. In the early-minus-late tracking method, a first correlator measures an equivalent autocorrelation function when the local replica signal is shifted to an "early" time $t_E$ relative to the position ($\tau=t_P$) of an ideal or punctual replica, and a second correlator measures a second equivalent autocorrelation function when the local replica signal is shifted to a "late" time $t_L$. Early and late replicas of the punctual autocorrelation function $AC(\tau;P)$ are illustrated in FIG. 1B. By subtracting the late autocorrelation function from the early autocorrelation function, a correlation tracking function or autocorrelation difference function $\Delta AC(\tau)$ with a zero crossing, corresponding to the autocorrelation function peak can be developed, if the separations of the early and late time shifts from the punctual time shift are chosen to be equal. A representative early-minus-late tracking function $\Delta AC(\tau)$ is shown in FIG. 1C.

If the tracking or time shift variable $\tau$ for the autocorrelation difference function $\Delta AC(\tau)$ lies to the left (to the right)

of the zero crossing point, the system uses the presence of positive (negative) values of $\Delta AC(\tau)$ to increase (decrease) the value of $\tau$ and drive the system toward the zero crossing point for $\Delta AC(\tau)$. The zero-crossing point is thus easily measured and tracked, and the equivalent peak value and peak location for the autocorrelation function is easily determined. At the zero-crossing point on this doublet-like tracking function, maximum correlation occurs between the incoming signal and the local replica signal. The zero-crossing point represents the best estimate of time shift $\tau$ for signal synchronization. The internal clock time corresponding to the zero crossing point is a good estimate for time of arrival of an incoming signal at the receiver.

Superposition of an equivalent autocorrelation function for the multipath signal (reduced in magnitude and delayed in time) onto the autocorrelation function $AC(\tau)$ for the desired satellite code signal is a useful model for analyzing the effects of presence of multipath signals, as noted in the Fenton et al patent and in the Lennen patent, op. cit. Superposition of any additional signal onto the desired incoming signal, during the time period when signal correlation occurs, will distort the desired autocorrelation function $AC(\tau;direct)$ and produce an altered autocorrelation function $AC(\tau;composite)$ for the composite signal (direct plus multipath). An autocorrelation function for an uncorrupted or "pure" direct signal is shown along with a representative, attenuated and time delayed, multipath autocorrelation function with positive relative polarity, compared to the direct signal, in FIG. 2A. The autocorrelation for the composite, corrupted incoming signal is obtained by summing the two autocorrelation functions and is compared with the uncorrupted autocorrelation function in FIG. 2B. FIGS. 2C and 2D are similar graphs, showing the autocorrelation function for a multipath signal with negative relative polarity, compared to the direct signal. Any such distortion produces errors in the indicated zero-crossing point on the early-minus-late correlation tracking function. These errors in indicated punctual time shift produce errors in the pseudorange measurements, and will in turn produce an error in the final computed estimate of location coordinates for the receiver.

Another useful and equivalent model for analyzing the effects of presence of a multipath signal computes the autocorrelation functions $AC(\tau;x;direct)$ and $AC(\tau;x;multipath)$ (x=E, L) for the pure direct signal and the pure multipath signal, forms the differences $\Delta AC(\tau;direct)$ and $\Delta AC(\tau;multipath)$ and adds these two difference functions to obtain the autocorrelation difference function $\Delta AC(\tau;composite)$ for the composite signal.

Representative autocorrelation difference functions for a direct incoming signal and a composite incoming signal are shown in FIGS. 3B and 3D for positive relative multipath polarity and negative relative multipath polarity, respectively, compared to the direct signal. The tracking error due to presence of the multipath signal, obtained from the difference in zero crossing points for the direct signal and for the composite signal, is easily seen from these figures.

Previous work in the area of multipath amelioration has focussed on two approaches: 1) estimating the effects and compensating for multipath-induced errors, and 2) attempting to limit the effects of the estimated multipath errors. In the Lennen patents, op. cit., both approaches are described. The estimation methods seek to model the distortions to the instantaneous autocorrelation function and to create a correction term to subtract from the indicated punctual time. Estimation methods are worthwhile but can never obtain perfection, wherein all multipath effects are removed, because the multipath signals are constantly varying and corrections can only be done after the fact.

A multipath limitation method, such as described in the Lennen patent, op. cit., operates the early-minus-late correlation tracking loop with a shorter delay between the early signal and late signal correlators than previous methods had employed. This limitation method reduces the effects of the presence of multipath substantially. In FIGS. 1B and 1C, the autocorrelation function $AC(\tau)$ and the corresponding tracking function $\Delta AC(\tau)$ are shown for the case where the early-minus-late time delay is approximately 0.15 times the width $\Delta\tau_{chip}$ of a digital signal bit or chip.

Several workers have analyzed correlation functions and/or have used pseudorandom signal sequences in attempting to estimate or suppress the effects of the presence of multipath signals. Examples of these are Winters in U.S. Pat. No. 4,007,330, Tomlinson in U.S. Pat. No. 4,168,529, Bowles et al in U.S. Pat. Nos. 4,203,070 and 4,203,071, Guignon et al in U.S. Pat. No. 4,550,414, Dickey et al in U.S. Pat. No. 4,608,569, Liebowitz in U.S. Pat. No. 4,660,164, Borth et al in U.S. Pat. No. 4,829,543, McIntosh in U.S. Pat. No. 4,862,478, Wales in U.S. Pat. No. 5,091,918, Fenton et al in U.S. Pat. Nos. 5,101,416, 5,390,207, 5,414,729 and 5,495,499, Cai et al in U.S. Pat. No. 5,164,959, Scott et al in U.S. Pat. No. 5,282,228, Meehan in U.S. Pat. No. 5,347,536, Lennen in U.S. Pat. Nos. 5,402,450 and 5,493,588, Johnson et al in U.S. Pat. No. 5,444,451, Kuhn et al in U.S. Pat. No. 5,481,503, and Fox et al in U.S. Pat. No. 5,488,662.

In previous methods for multipath amelioration, samples are taken of the incoming direct (desired) signal plus the incoming multipath signal(s) over the entire width of the chip, using a uniform sampling rate and without assigning any variable weighting to the samples. Further, little or no account is taken of the effect of bit value transitions for consecutive bits for the incoming digital signal. What is needed here is an approach that obtains correlation information from portions of a chip width where the effects of presence of multipath signals are suppressed, by examining bit value transitions for consecutive bits for the incoming digital signal and by use of this information to choose a (non-uniform) weighting function for formation of a modified autocorrelation function for the incoming digital signal. Preferably, the approach should be adaptable to allow suppression of a controllable amount of multipath signal contributions to the autocorrelation function and should continue to provide tracking indicators that indicate the direction of time shift required to achieve signal synchronization as the unit operates.

SUMMARY OF THE INVENTION

These needs are met by the invention, which provides a method that dynamically changes the shape of a non-uniform weighting function $w(t;q)$, used to form an autocorrelation function for an incoming digital signal, based on the relative values, $b_{n-2}$, $b_{n-1}$ and $b_n$, of two or three consecutive bits in a replica $S_d(t)$ of a digital bit sequence representing the incoming digital direct signal, with multipath and noise absent. Here q represents one or more parameters used to define the weighting function $w(t;q)$. A weighting function is chosen from among a population of two or more such weighting functions to suppress or de-emphasize the contributions of a multipath signal to an early-minus-late autocorrelation difference function $\Delta AC(\tau;q)=AC(\tau;E;q)-AC(\tau;L;q)$ in a selected region of the time shift variable $\tau$. In a first embodiment, the weighting function chosen to form the autocorrelation functions $AC(\tau;x;q)$ (x=E, L) and the difference function $\Delta AC(\tau;q)$ will vary with the relationship between two consecutive bit values $b_{n-1}$ and $b_n$. If a bit value transition occurs so that $b_{n-1} \neq b_n$, a first weighting function is used to form the autocorrelation difference function. If no bit value transition occurs so that $b_{n-1} = b_n$, a second weighting function is used that suppresses the corresponding contribution of this region of the time domain to the autocorrelation difference function $\Delta AC(\tau;q)$. Using this approach, the noise contribution is suppressed relative to the signal contribution so that the signal-to-noise ratio (SNR) is enhanced.

In a second embodiment, the relationship between three consecutive bit values $b_{n-2}$, $b_{n-1}$ and $b_n$ is examined. If $b_{n-2} = b_{n-1} \neq b_n$, a first weighting function is used that enhances the contribution of the direct signal and/or reduces the contribution of a multipath signal that may be present in the composite signal; and if $b_{n-2} \neq b_{n-1}$, or if $b_{n-1} = b_n$, or if both of these conditions occur, a second weighting function is chosen that suppresses the contribution of this portion of the time domain to the autocorrelation difference function $\Delta AC(\tau;q)$. With this approach, the contribution of a multipath signal to the autocorrelation difference function is suppressed. The choice of weighting function thus varies dynamically as the bit values of two consecutive bit values, or three consecutive bit values, change.

In a third embodiment, if a bit value transition occurs so that $b_{n-1} \neq b_n$, a first weighting function is used to form the autocorrelation difference function; and if no bit value transition occurs so that $b_{n-1} = b_n$, a second weighting function, related to the first weighting function but with changed periodicity, is used to form the autocorrelation difference function.

In a fourth embodiment, if $b_{n-2} = b_{n-1} \neq b_n$, a first weighting function is used to form the autocorrelation difference function; and if $b_{n-2} \neq b_{n-1}$ and/or $b_{n-1} = b_n$, a second weighting function, related to the first weighting function but with changed periodicity, is used to form the autocorrelation difference function.

The invention begins with the realization, utilized in a companion patent application, U.S. Ser. No. 08/650,331, by the title "Suppression of Multipath Signal Effects", filed May 20, 1996 and assigned to the same assignee, that the useful information to be obtained from the incoming digital composite signal is available primarily in digital signal bit value transition regions, where the bit value for the incoming digital direct signal $S_d(t)$ changes state. Contributions from samples that contain no useful information, but that do contain multipath signal effects that produce erroneous distortions in the corresponding autocorrelation function and in the resulting correlation tracking function, are ignored or suppressed. By ignoring or suppressing the contribution of samples taken in regions where no transition in a signal bit value can occur, the receiver can suppress the effects of multipath signals. The portion of a chip width where the autocorrelation difference function $\Delta AC(\tau;q)$ is substantially zero is much larger than in any of the previous methods for ameliorating the presence of multipath signals. Previous methods produced wider regions of non-zero $\Delta AC(\tau;q)$ for the desired signal. The invention, which may be characterized as non-uniform weighting of the sampling function used to create $AC(\tau;x;q)$, provides a method for substantially eliminating the possibility for experiencing multipath effects in correlation tracking.

A tracking point or zero-crossing point $\tau = t_P$ associated with the difference $\Delta AC(\tau)$ of the autocorrelation functions $AC(\tau;E)$ and $AC(\tau;L)$ is determinable as before, but with reduced contributions from the direct signal and from the multipath signal in a selected central region that does not include the tracking point $\tau = t_P$. This central region does not include any time shift values t for which the instantaneous value of a reference or local replica digital direct signal $S_d(t+\tau)$ can make a signal bit value transition (from 0 to 1, or from 1 to 0) relative to the instantaneous value of an incoming digital composite signal s(t). Thus, little or no qualitative information is lost by de-emphasizing the contribution of this central region to a corresponding autocorrelation function. However, much of the important information arising from presence of the multipath signal is also present in this central region, and this multipath information is suppressed or de-emphasized by suppressing the contribution of this central region to the autocorrelation function. Location of the "true" tracking point for the direct signal (absent multipath) is unchanged or is changed only minimally by this approach; the contribution of the multipath signal in the selected central region is reduced to substantially zero.

The invention in the related patent application, 08/650,331, suppresses the contribution of a central region to the computed autocorrelation function $AC(\tau;x;qx)$ (x=E, P or L) for the composite signal by imposing a non-uniform weighting function $w(t;q)$ in the integral or sum of the digital signal product $s(t)S_d(t+\tau)$ over a chosen time interval $t1 \leq t \leq t2$, to produce an adjusted or modified autocorrelation function. In one embodiment, the weighting function $w(t;q)$ is positive (or negative) in signal bit value transition regions ($t \approx t1$ and $t \approx t2 = t1 + \Delta\tau_{chip}$) and tends monotonically toward zero as $\tau$ approaches an intermediate time t3 (t1<t3<t2) from either side; this type of non-uniform weighting function is referred to as a "notch" function. The chip half-width $\Delta\tau_{chip}/2 = (t2-t1)/2$ might be chosen to be the inverse of twice the carrier frequency, $(2 f_{carrier})^{-1}$, associated with the reference digital signal $S_d(t)$. The contributions of different portions of the "contribution interval", t1<t<t2, are weighted non-uniformly to reduce the effects of a multipath signal in a central region surrounding a tracking point, as discussed above. In another embodiment, the weighting function $w(t;q)$ is chosen to be an "anti-notch" function, which is defined as a constant minus a notch function. In another embodiment, the weighting function $w(t;q)$ is unrestricted and may have positive, zero and negative values anywhere in the interval t1<t<t2.

One embodiment of the invention disclosed and claimed in this patent application improves the analysis of the autocorrelation functions $AC(\tau;x;qx)$ (x=E, P or L) and of the autocorrelation difference function $\Delta AC(\tau;q)$ by providing at least two distinct weighting functions $W1(t;q)$ and $W1\#(t;q)$, at least one of which is non-uniform, and by selecting which weighting function will be used at a given time to compute $AC(\tau;x;qx)$ and $\Delta AC(\tau;q)$ based upon characteristics of two, three or more consecutive incoming digital signal bit values, $b_{n-2}$, $b_{n-1}$ and $b_n$. In a first embodiment, if no bit transition occurs between bit value $b_{n-1}$ and bit value $b_n$, the contribution to the autocorrelation function $AC(\tau;x;qx)$ of the time interval $t \approx t_n$ (corresponding to the bit region where $b_{n-1}$ changes to $b_n$) is ignored or drastically suppressed, by use of a different weighting function than the weighting function used if $b_{n-1} \neq b_n$. In a second embodiment, if (1) no bit value transition occurred between bit value $b_{n-2}$ and bit value $b_{n-1}$ ($b_{n-2} = b_{n-1}$) and (2) a bit value transition occurs between bit value $b_{n-1}$ and bit value $b_n$ ($b_{n-1} \neq b_n$), a first weighting function $w1(t;q)$ is used to compute the autocorrelation functions $AC(\tau;x;qx)$ (x=E, L) and the autocorrelation difference function $\Delta AC(\tau)$. If either or both of these two conditions is not both met, a second weighting function w1^(t;q) (which may be identically zero) is used to compute the autocorrelation functions $AC(\tau;x;qx)$ and the autocorrelation difference function $\Delta AC(\tau;q)$. One result of this approach is that the contribution of any multipath signal that may be present in a composite signal (direct plus multipath) is further suppressed.

Another embodiment of the invention provides a method for decoding a signal to reduce signal distortion, using the steps of: (1) receiving a signal having at least two consecutive bits, with each bit having a value that is represented in the received signal over a time interval; (2) generating a reference signal having at least two consecutive bits, for matching the received signal; (3) generating a weighting signal, having an amplitude that varies over time, that conforms to (a) a first sequence of weighting values when each bit of a consecutive bit sequence of the reference signal is part of a predetermined bit sequence and (b) a second sequence of weighting values when at least one bit of a consecutive bit sequence of the reference signal is not part of a predetermined bit sequence; and (4) mixing the received signal, the reference signal and the weighting signal to determine a timing relationship between the received signal and the reference signal.

In addition, the first and second sequences of weighting values can be represented in the weighting signal over a selected time interval having a length that is less than the length of the time interval (one chip) for representing one of the bit values, and the selected time interval can be begun a selected time increment before the beginning of a respective time interval for each reference signal bit.

In one version, a reference signal bit sequence having two consecutive bits is examined. The first sequence of weighting values is used when the two consecutive bits have different bit values, and the second sequence of weighting values is used when the two consecutive bits have the same bit value.

In another version, a reference signal bit sequence having three consecutive bits is examined. The first sequence of weighting values is used when (i) the first and second consecutive bits of a three-bit sequence have the same bit value and (ii) the third consecutive bit in the three-bit sequence has a different bit value. The second sequence of weighting values is used when at least one of the conditions (i) and (ii) for use of the first sequence of weighting values is not satisfied.

BRIEF DESCRIPTION OF THE DRAWINGS

FIGS. 22A–22E and 24A–24L are timing diagrams for signals produced by the apparati in FIGS. 21 and 23, respectively.

DESCRIPTION OF BEST MODES OF THE INVENTION

Figure 1A:
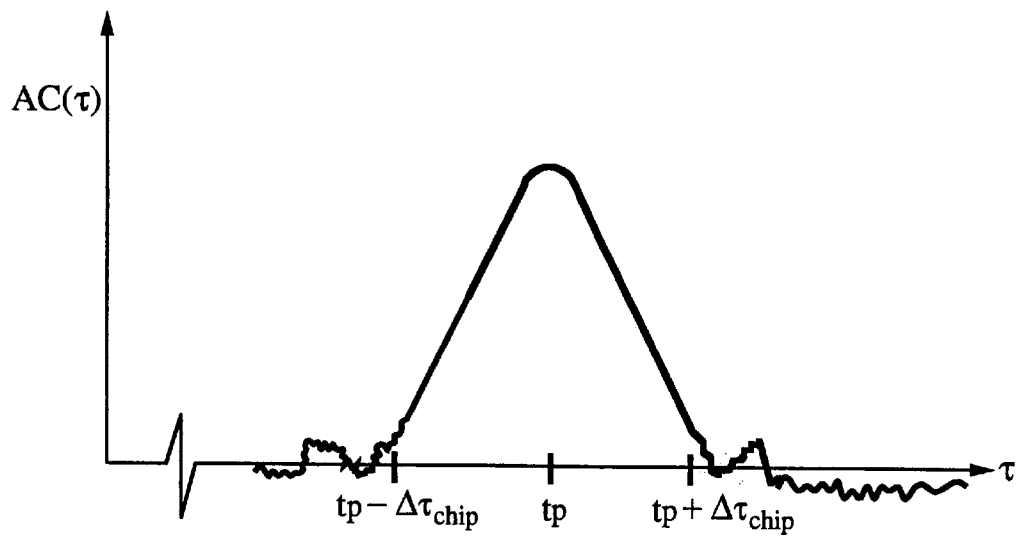
FIGS. 1A and 1B are graphical views of a representative autocorrelation function $AC(\tau;x)$ (x=P, E, L).
Figure 1B:
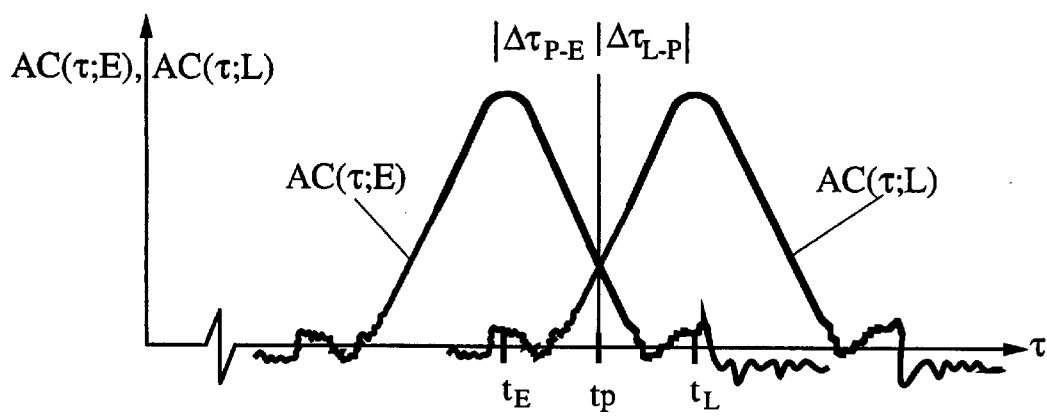
Figure 1C:
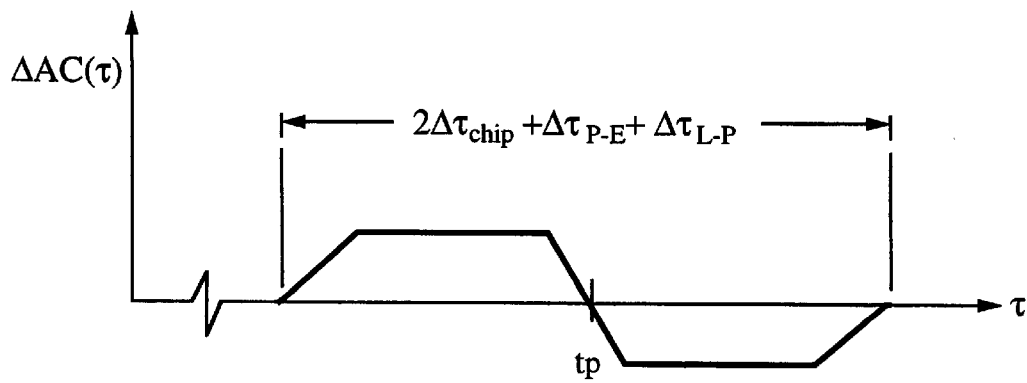
FIG. 1C is a graphical view of an early-minus-late autocorrelation function difference signal $\Delta AC(\tau)=AC(\tau;E)-AC(\tau;L)$ formed from the autocorrelation functions shown in FIG. 1B. In all early-minus-late autocorrelation difference functions shown herein, unless otherwise stated, the early-minus-late spacing $\Delta t_{L-E}=t_L-t_E$ is 15 percent of the chip width $\Delta \tau_{chip}$ for definiteness. Other values for $\Delta t_{L-E}$ can be used here.
Figure 4A:
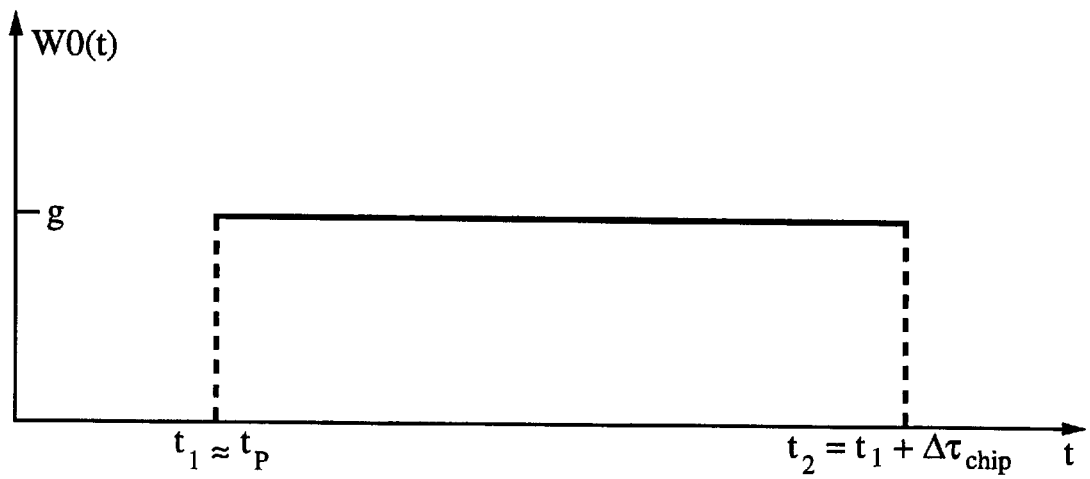
FIG. 4A illustrates a uniform weighting function w0=1.
Figure 4B:
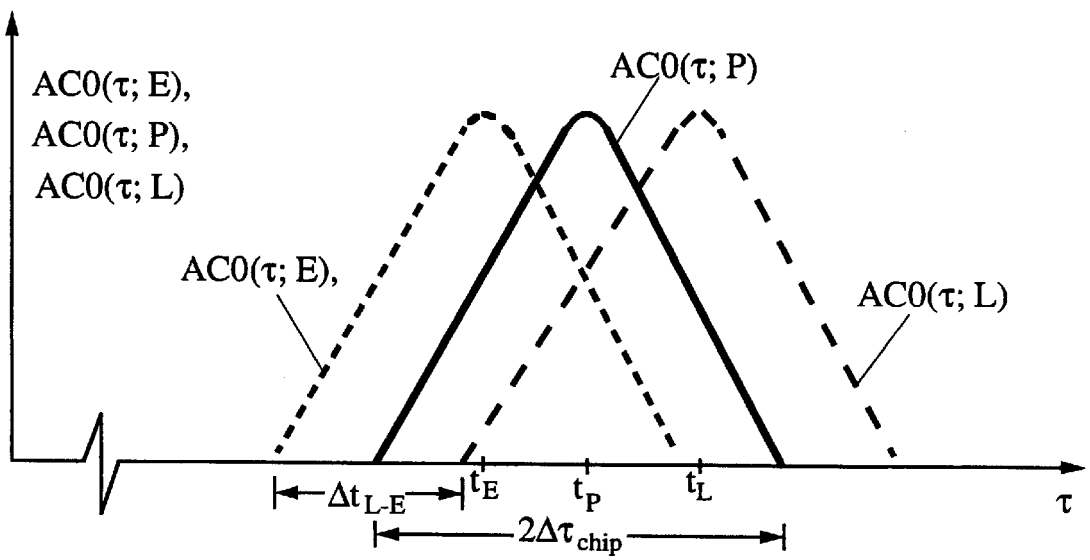
FIGS. 4B and 4C are graphical views of punctual (P), early (E) and late (L) autocorrelation functions $AC0(\tau;x)$ and of an early-late autocorrelation difference function $\Delta AC0(\tau)$, computed conventionally.

In a conventional approach, no variable weighting is used in computing the autocorrelation function. Equivalently, the weighting function applied to the integrand or summand is constant: w0(t)=g (constant)>0, with g=1 preferred, across the contribution interval, for example, $t_P - \Delta\tau_{chip}/2 \leq t \leq t_P + \Delta\tau_{chip}/2$, as illustrated in FIG. 4A. The quantity $\Delta\tau_{chip}$ is the temporal length of one bit in the incoming digital signal of interest. An autocorrelation function $\Delta C0(\tau)$, computed without a variable weighting function, has small or vanishing values outside the interval $t_P - \Delta\tau_{chip} \leq t \leq t_P + \Delta\tau_{chip}$, due to the properties of pseudorandom sequences that are used for the direct signal. As the autocorrelation displacement variable $\tau$ increases from $\tau = t_P - \Delta\tau_{chip}$ to $\tau = t_P + \Delta\tau_{chip}$, the autocorrelation function increases approximately linearly to a maximum value at a tracking point $\tau \approx t_P$, then decreases approximately linearly beyond the tracking point (FIG. 1A). This conventional approach is equivalent to using the uniform weighting function w0(t), shown in FIG. 4A, in computing a conventional autocorrelation function $AC0(\tau;x)$ (x=E, P or L), shown in FIG. 4B, and in computing a conventional early-minus-late autocorrelation difference function $\Delta AC0(\tau)$, illustrated in FIG. 4C. The time shift values $\tau = t_E$ and $\tau = t_L$ chosen for the approximate peak values of the replica autocorrelation functions $AC0(\tau;x)$ (x=E or L) satisfy the constraints $t_P - \Delta\tau_{chip} < t_E < t_P < t_L < t_P + \Delta\tau_{chip}$, where $\tau = t_P$ is the time shift value for the actual peak in the measured autocorrelation function. The time shift values $\tau = t_E$ and $\tau = t_L$ may be, but need not be, chosen symmetrically about time shift value $\tau = t_P$.

Assume that a multipath signal $S_m(t;\Delta t_m)$ is present, with a time delay $\Delta t_m$ and reduced in magnitude relative to the direct signal $S_d(t)$, in the incoming digital composite signal $s(t) = S_d(t) + S_m(t;\Delta t_m)$. The time-delayed and reduced-amplitude multipath signal $S_m(t;\Delta t_m) \approx \chi S_d(t - t_P - \Delta t_m)$ ($|\chi| < 1$) is also summed across the contribution time interval in formation of the autocorrelation signal $AC(\tau;x)$ (x=E, P or L). Because of linear superposition, the multipath signal $S_m(t;\Delta t_m)$ contributes a proportional amount (reduced in amplitude and delayed in time as indicated) to the early and late autocorrelation functions $AC(\tau;E)$ and $AC(\tau;L)$ and to the difference function $\Delta AC(\tau) = AC(\tau;E) - AC(\tau;L)$ for the incoming digital composite signal s(t). Typical multipath signal contributions to $AC(\tau;x)$ (x=E, L) are illustrated in FIGS. 2A, 2B, 2C and 2D.

Figure 2A:
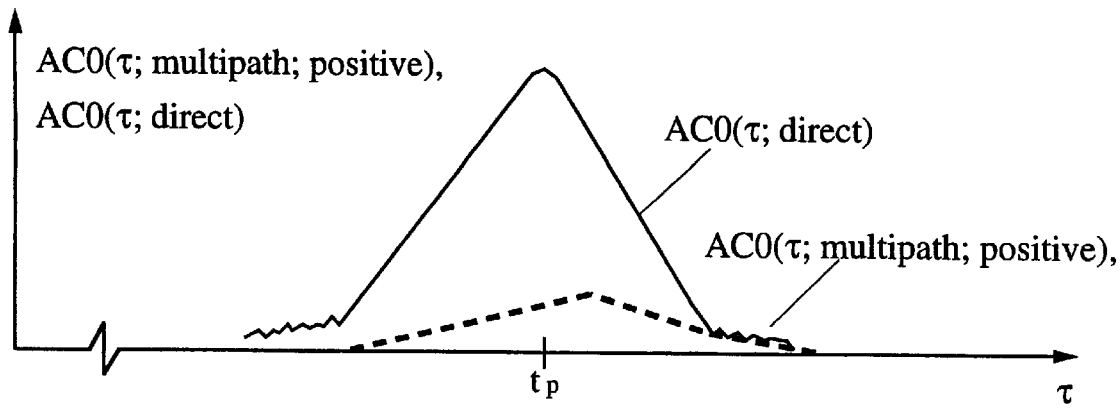
FIGS. 2A and 2B compare an autocorrelation function $AC(\tau;direct)$, formed using only a direct signal, with an autocorrelation function $AC(\tau;multipath)$ and $AC(\tau;composite)$, respectively, where the multipath signal included in the composite signal has positive polarity relative to the direct signal.
Figure 2B:
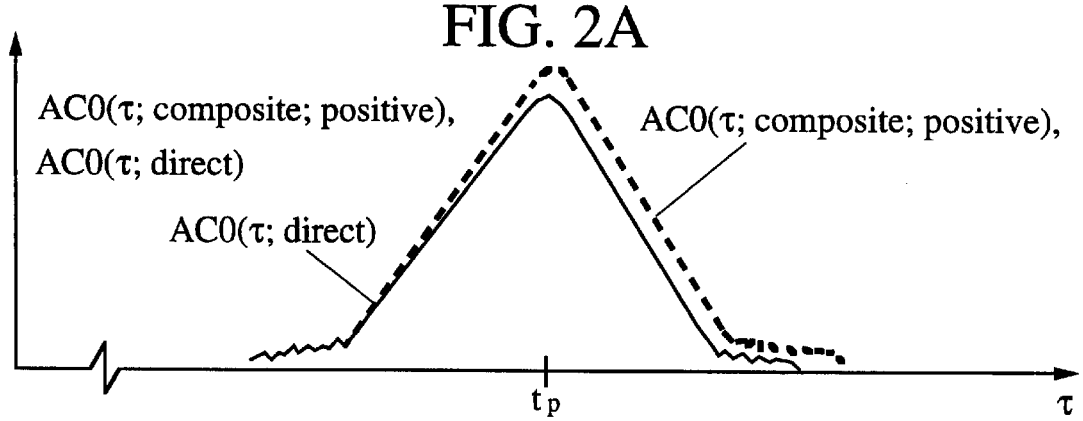
Figure 2C:
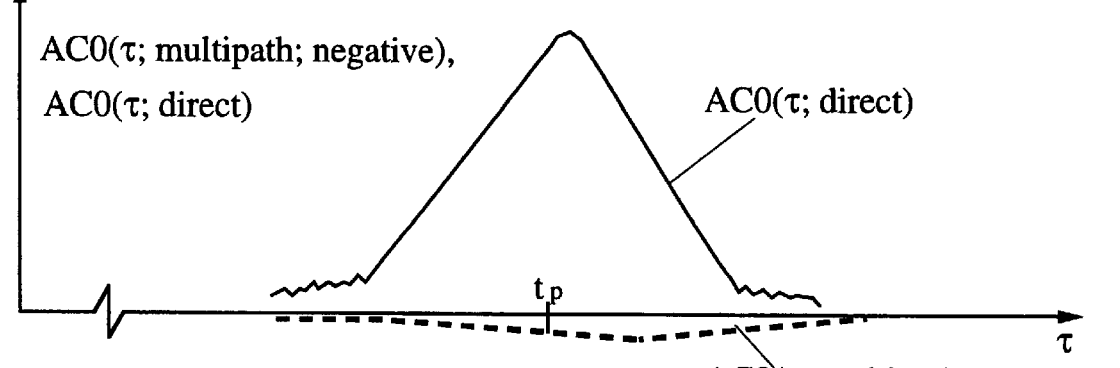
FIGS. 2C and 2D compare an autocorrelation function $AC(\tau;direct)$, formed using only a direct signal, with an autocorrelation function $AC(\tau;multipath)$ and $AC(\tau;composite)$, respectively, where the multipath signal included in the composite signal has negative polarity relative to the direct signal.
Figure 2D:
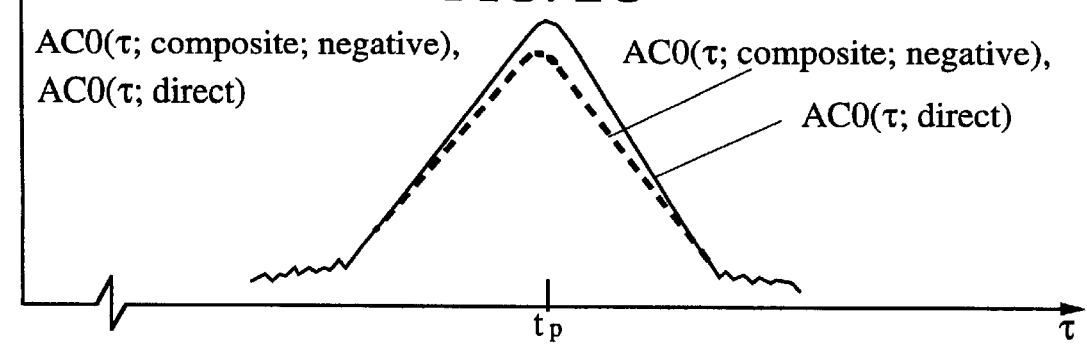

The polarity of a multipath signal $S_m(t\Delta t_m)$ that is part of an incoming digital composite signal may be positive or negative relative to the desired digital direct signal $S_d(t)$. A multipath signal with positive relative polarity will add to the direct signal contribution to the autocorrelation function for a composite signal. FIGS. 2A and 2C compare the autocorrelation function $AC(\tau;x;direct)$ with the multipath-only functions $AC(\tau;x;multipath;positive)$ and $AC(\tau;x;multipath;negative)$ for a "bare" multipath signal having positive and negative multipath relative polarity, respectively. A multipath signal with positive (negative) multipath relative polarity will add to (subtract from) the direct signal contribution in the autocorrelation function $AC(\tau;x;composite)$. FIGS. 2B and 2D compare the autocorrelation function $\Delta AC(\tau;x;direct)$ with the respective composite signal functions $AC(\tau;x;composite;positive)$ and $\Delta AC(\tau;x;composite;negative)$.

Because the effects of presence of a multipath signal are additive, one can analyze the autocorrelation difference functions by using the sum $\Delta AC(\tau;direct) + \Delta AC(\tau;multipath)$ or by forming the sum composite signal=direct signal+multipath signal before the autocorrelation difference function $\Delta AC(\tau;composite)$ is computed.

Figure 3A:
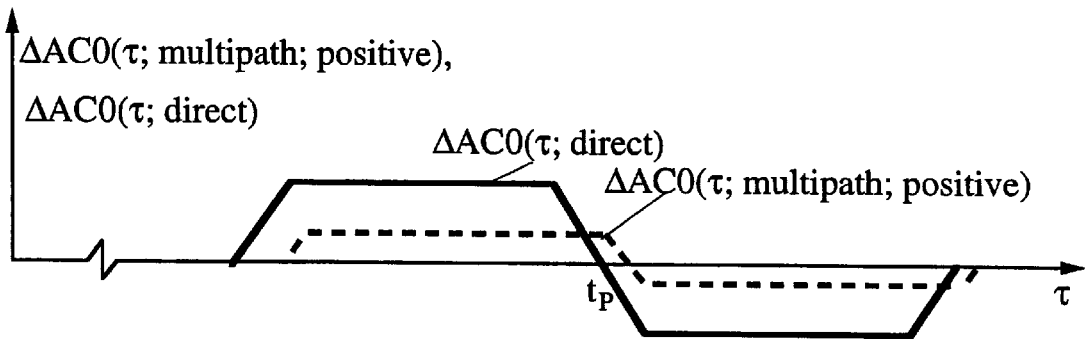
FIGS. 3A and 3B compare an autocorrelation difference function $\Delta AC(\tau;direct)$, formed using only a direct signal, with an autocorrelation difference function $\Delta AC(\tau;multipath)$ and $\Delta AC(\tau;composite)$, respectively, where the multipath signal in the composite signal has positive polarity relative to the direct signal.
Figure 3B:
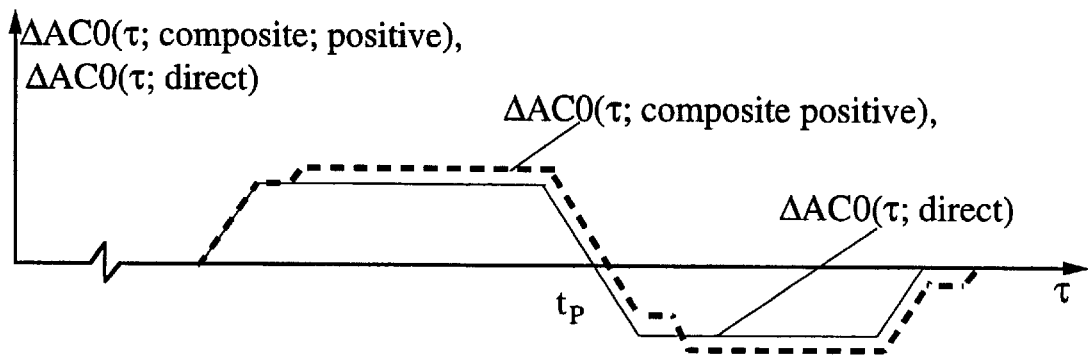
Figure 3C:
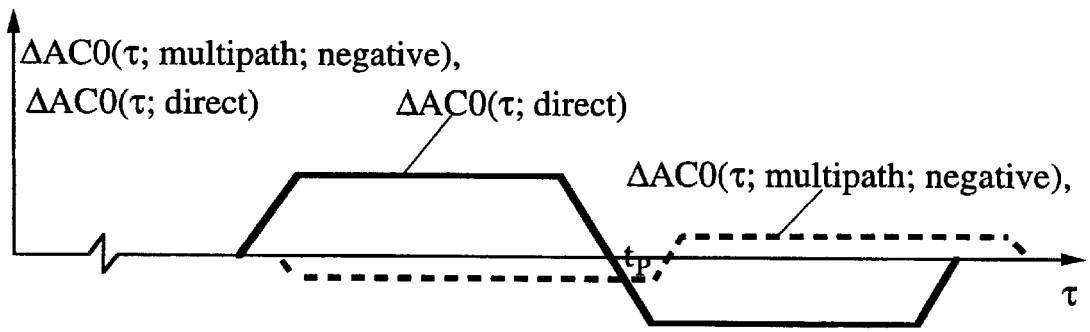
FIGS. 3C and 3D compare an autocorrelation difference function $\Delta AC(\tau;direct)$, formed using only a direct signal, with an autocorrelation difference function $\Delta AC(\tau;multipath)$ and $\Delta AC(\tau;composite)$, respectively, where the multipath signal in the composite signal has negative polarity relative to the direct signal.
Figure 3D:
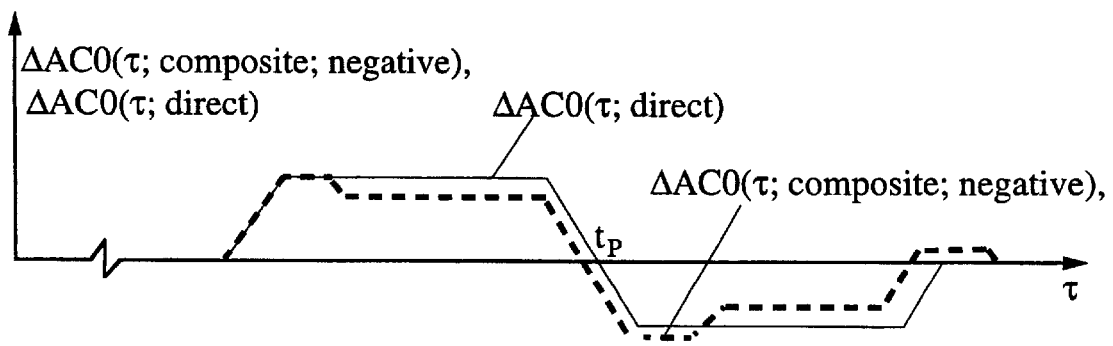

FIGS. 3A and 3C graphically illustrate the autocorrelation difference functions $\Delta AC(\tau;direct)$ (solid curve) and $\Delta AC(\tau;multipath)$ (broken line curve) for two representative situations, using the constant weighting function w0(t)=1 in FIG. 4A, where the multipath signal has positive and negative relative polarity, respectively. FIGS. 3B and 3D graphically compare $\Delta AC(\tau;direct)$ and $\Delta AC(\tau;composite)$ for positive and negative relative multipath polarity, respectively. Note that the apparent tracking or zero crossing point, where $\Delta AC(\tau;composite)$ for the composite signal is shifted to the right ($t_{P+}$) or to the left ($t_{P-}$) relative to the desired tracking point $\tau = t_P$ for the direct signal, depending in part on the relative multipath polarity.

Figure 5A:
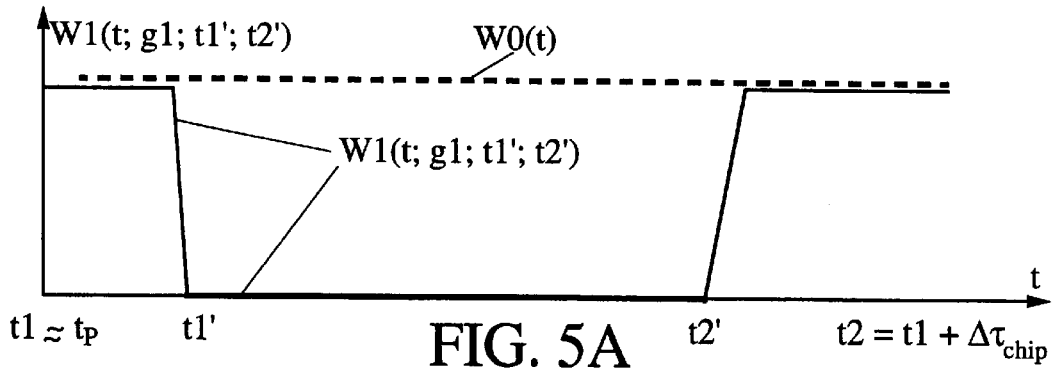
FIGS. 5B and 5C are graphical views comparing an autocorrelation function $AC1(\tau;x;qx)$ (x=E, P or L) and an early-late autocorrelation difference function $\Delta AC1(\tau;q)$, computed using a non-uniform weighting function (two-value step function) w1 shown in FIG. 5A, with $AC0(\tau;x)$ and $\Delta AC0(\tau;x)$.
FIG. 5D illustrates a multi-interval weighting function.
Figure 5B:
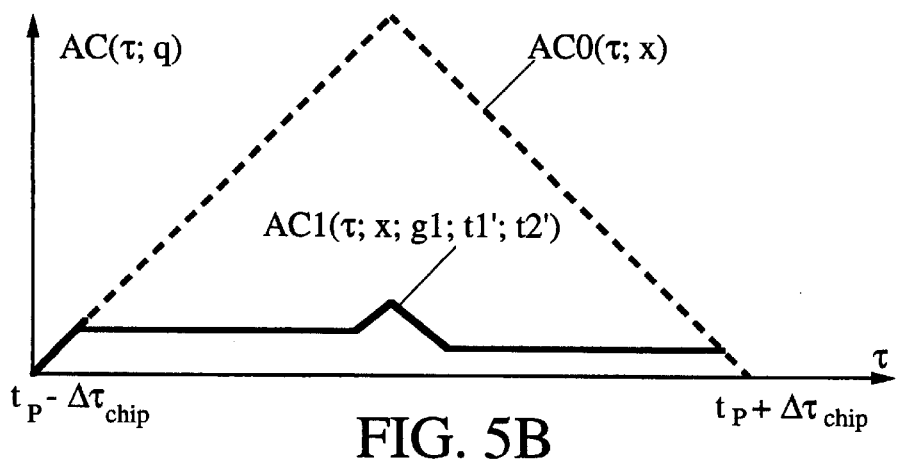
Figure 5C:
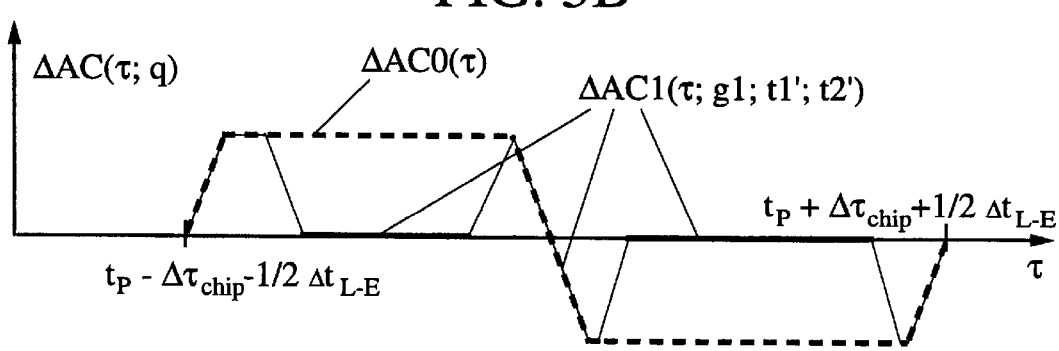

In one embodiment of the invention, illustrated in FIGS. 5A, 5B and 5C, a non-uniform weighting function w1(t;g1;t1';t2') is used that may be continuous or discontinuous and is not necessarily symmetric. The endpoints t1 and t2 of the time interval used for definition of the weighting function, such as w1(t;g1;t1';t2'), satisfy the constraints $$t1 \approx t_P, \qquad (2A)$$

$$t2 = t1 + \Delta\tau_{chip}, \qquad (2B)$$

For notational convenience herein, a set of weighting function parameters, such as g1, t1' and t2' for a non-uniform weighting function, such as w1, will often be denoted by a symbol "q". With this notation adopted, this weighting function becomes w1(t;q). In FIG. 5A, the weighting function w1(t;q) is a two-value step function that is non-zero only in regions near $t = t_P$, and near $t = t_P + \Delta\tau_{chip}$. In a center region, away from the tracking points $\tau = t_P$ and $\tau = t_P + \Delta\tau_{chip}$, where no signal bit transition can occur, little or no new qualitative information is presented, and use of a non-uniform weighting function w1(t;q) suppresses or de-emphasizes this largely redundant information, as discussed above.

A weighting function, such as w1(t;q), is preferably extended periodically, using a prescription such as $$w1(t;q) = w1(t + n\,\Delta\tau_{chip};q)\ (n = 0, \pm 1, \pm 2, \ldots). \qquad (3)$$

Where non-uniform weighting is used, an autocorrelation function is formed according to one of the prescriptions $$AC(\tau;q) = \int_o^T w(t' + \tau; q) s(t') S_d(t' + \tau) dt', \qquad (4A)$$

$$AC(\tau;q) = \sum_{k=1}^{K} w(t_k + \tau; q) s(t_k) S_d(t_k + \tau), \qquad (4B)$$

depending upon whether integration or summation of sampled values over a suitable contribution time interval is used to compute the composite autocorrelation function. The length T of the time interval used to compute the weighted autocorrelation function in Eq. (4A) or (4B) is often chosen to be N times the chip length $\Delta\tau_{chip}$, where N is a large positive integer.

FIG. 5B compares the approximate forms of the conventional punctual autocorrelation function $AC0(\tau;P)$, which uses a constant weighting function (w0(t)=1), with an adjusted punctual autocorrelation function $AC1(\tau;x;q)$ (x=P), which uses the non-uniform weighting function w1(t;q). The early and late autocorrelation functions AC1 (τ;E;q) and AC1(τ;L;q) are formed in a similar manner and have the same shape as the punctual autocorrelation function AC1(τ;P;q).

Figure 4C:
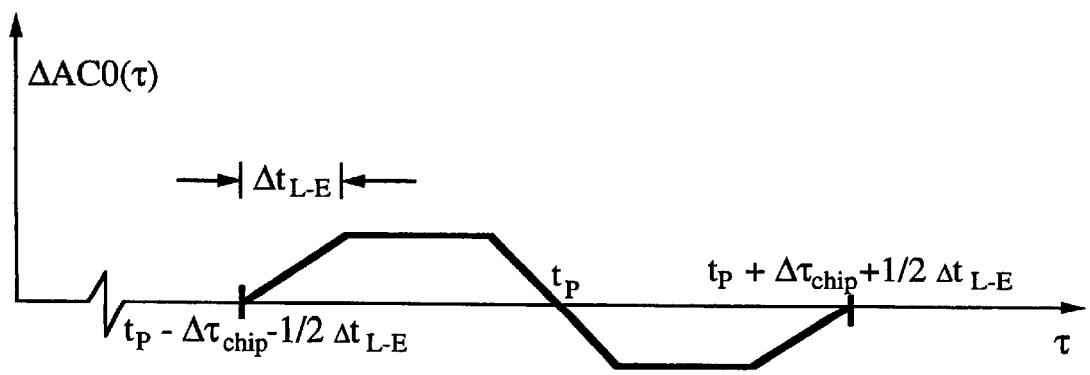

FIG. 5C illustrates the approximate form of the autocorrelation difference function ΔAC1(τ;q)=AC1(τ;E;q)−AC1(τ;L;q), which should be compared with the corresponding autocorrelation function difference ΔAC0(τ), shown in FIG. 4C and repeated as a dashed line curve in FIG. 5C, that uses a uniform weighting function w0(t)=1. The spacing intervals $\Delta t_{P-E}=t_P-t_E$ and $\Delta t_{L-P}=t_L-t_P$ are selected to be equal in each of FIGS. 4C and 5C. If the time shift variable τ for the autocorrelation difference function ΔAC1(τ;q) lies a small amount to the left (to the right) of the peak correlation location τ=$t_P$ or zero crossing value, the tracking system uses the presence of positive (negative) values of ΔAC1(τ;q) near this peak correlation location to increase (decrease) the value of the shift variable τ and drive the autocorrelation function AC1(τ;x;q) toward its peak correlation value, where ΔAC1(τ;q)=0.

Figure 5D:
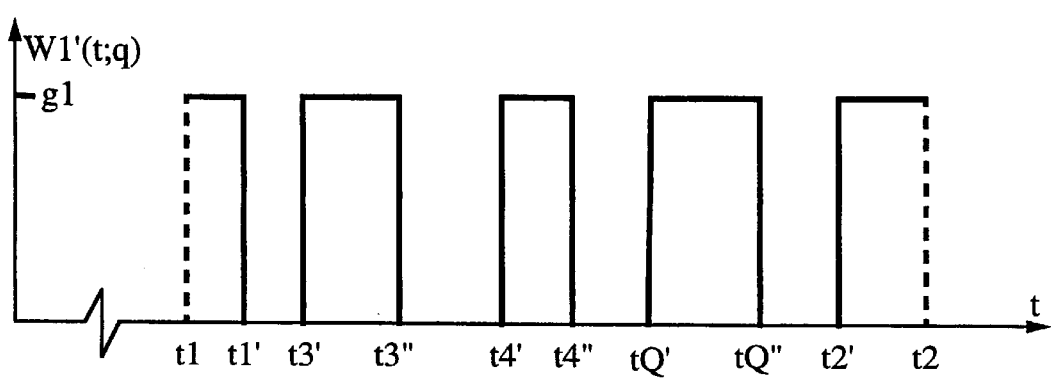

More generally, a non-uniform weighting function w1'(t;g1;t1';t2';t2"; . . . ; tn';tn";t(n+1)') that has a sequence of steps of equal amplitude (=g1) in the time intervals t1<t<t1', tk'<t<tk" (k=3, . . . , Q; Q≧3) and t2'<t<t2, illustrated in FIG. 5D, can be used here.

Where the non-zero amplitudes of the steps are equal, as in FIG. 5A or 5D, use of a non-uniform weighting function, such as w1(t;q) or w1'(t;q), is equivalent to use of non-uniform sampling density in forming the autocorrelation function AC(τ;q) in Eq. (4A) or (4B). In this non-uniform sampling approach, samples of incoming digital signal values in the regions t1 <t<t1', tk'<t<tk" and t2'<t<t2 are given a uniform, non-zero weight g, and samples in all other regions are assigned a weight of zero. Alternatively, non-uniform weighting and non-uniform sampling may be combined to compute an autocorrelation function.

Figure 6:
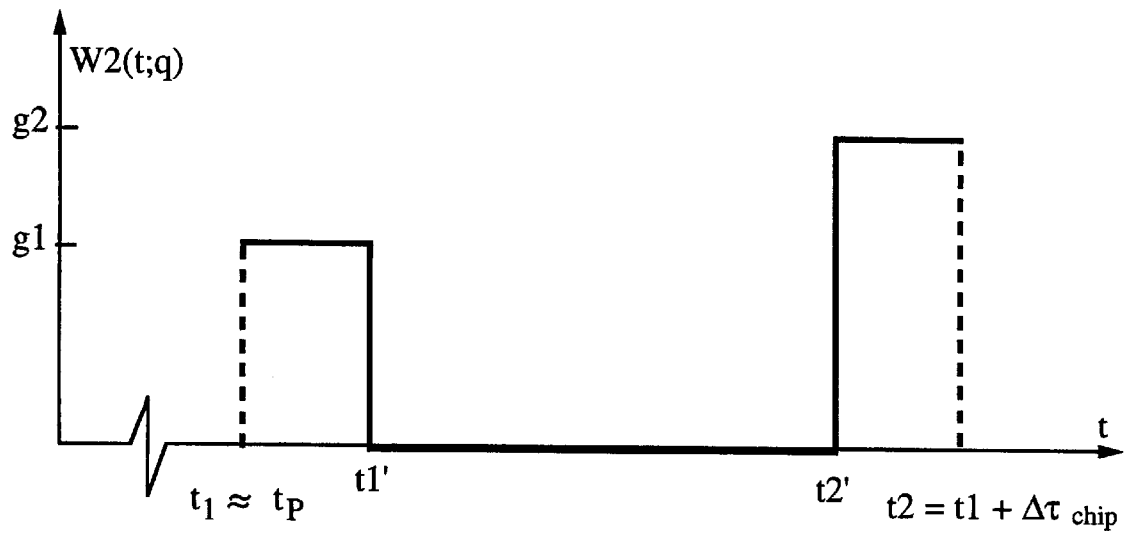
FIGS. 6–16 illustrate other non-uniform weighting functions that can be used with the invention to suppress or to emphasize multipath effects.
Figure 7:
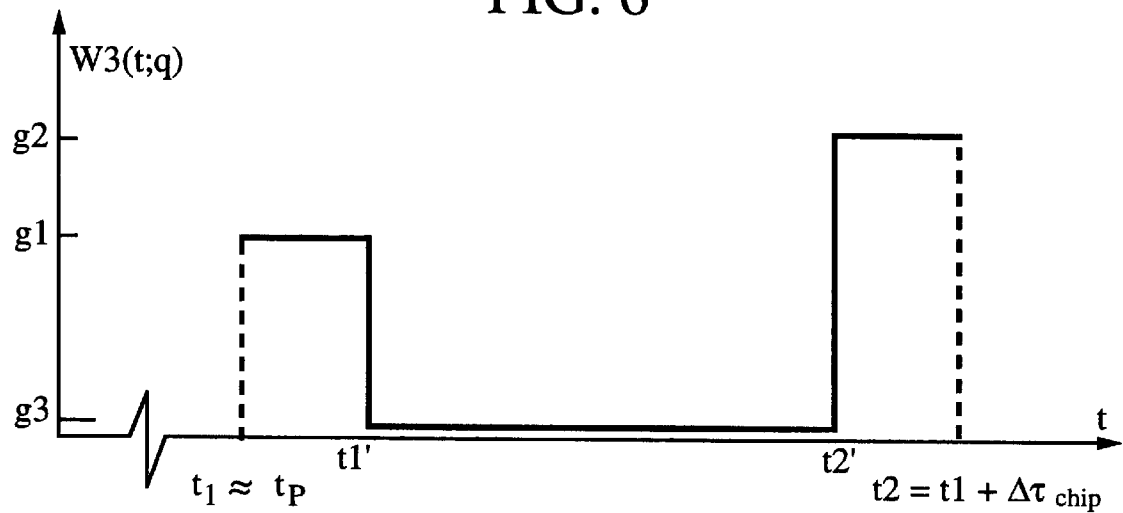
Figure 8:
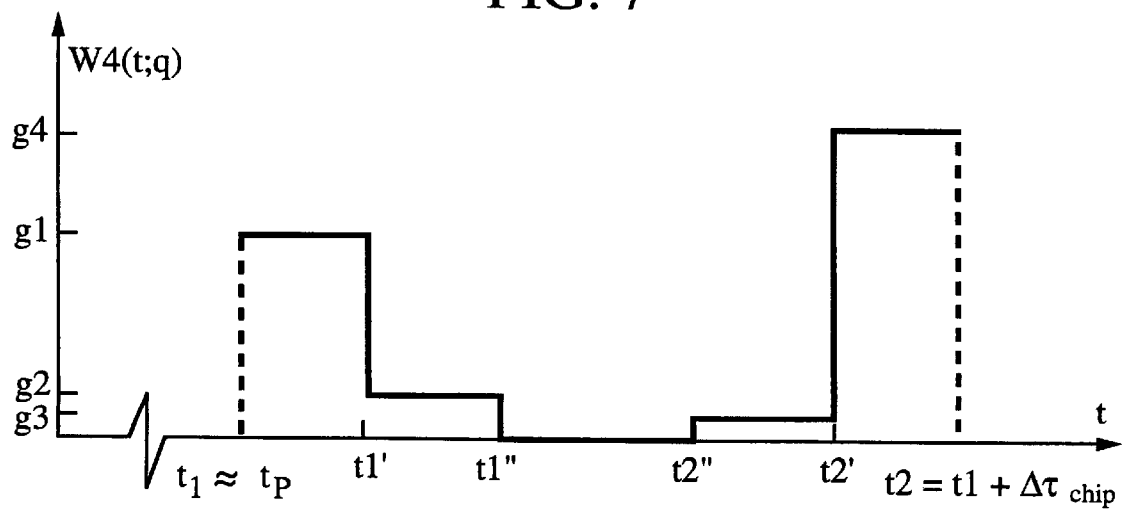
Figure 9:
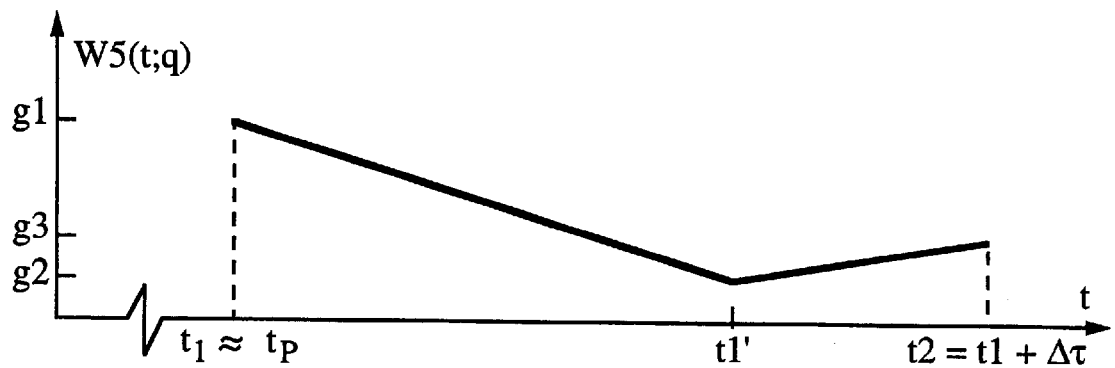
Figure 10:
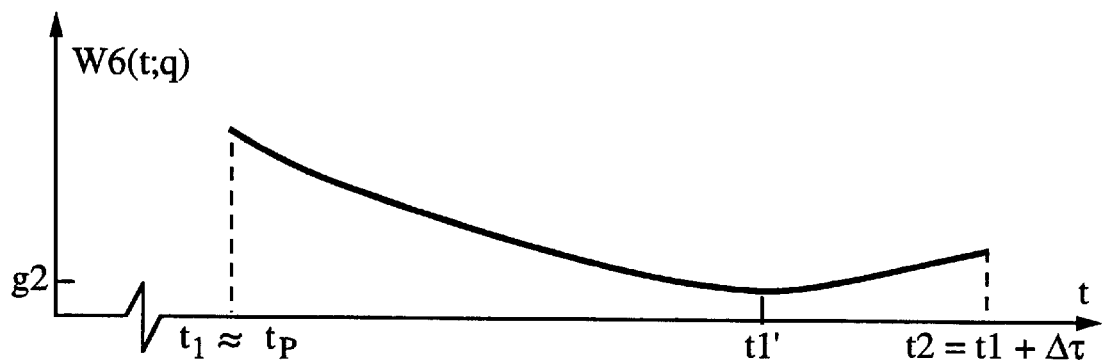
Figure 11:
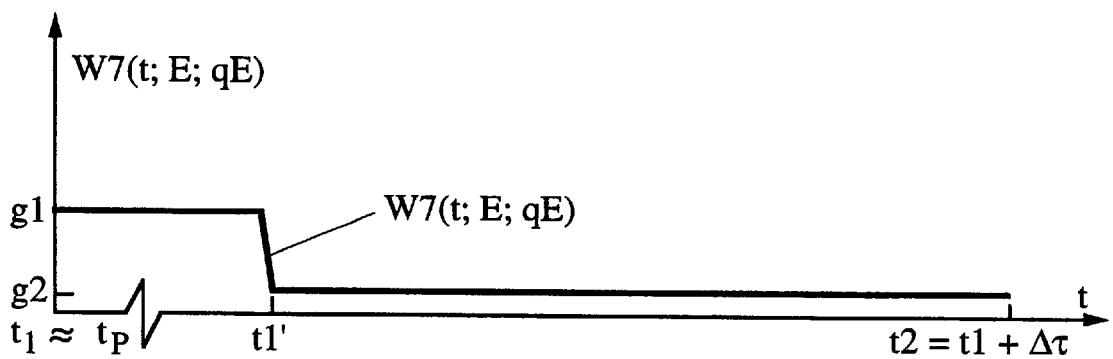
Figure 12:
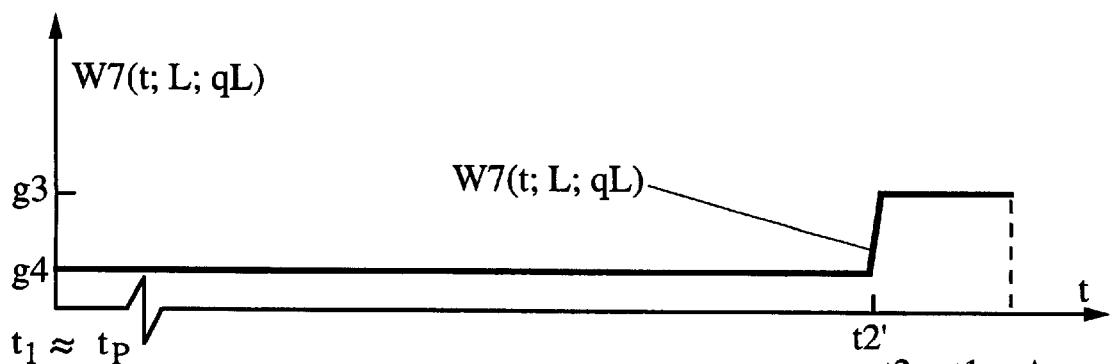

Other suitable non-uniform weighting functions w(t;q), each having one or more parameters q to define the function, are illustrated in FIGS. 6–16. Each of the weighting functions w2(t;q) and w3(t;q) in FIGS. 6 and 7 is a three-step weighting function, with amplitudes g1, g2 and g3, with one of these amplitudes being zero in FIG. 6. FIG. 8 illustrates a five-step weighting function w4(t;q). FIGS. 9 and 10 illustrate a triangular weighting function w5(t;q) and a power law weighting function w6(t;q), respectively. FIGS. 11 and 12 illustrate a first situation in which the weighting functions w7(t;E;q) and w7(t;L;q), used to form the autocorrelation functions AC(τ;E) and AC(τ;L), are chosen independently. FIGS. 5–12 illustrate non-uniform weighting functions wm(t;q) (m=1, 2, . . . , 7) that are "notch" functions. A "notch" function has positive values w(t1;q) and w(t2;q) at the two ends of the defining interval t1≦t≦t2 and decreases monotonically toward zero as the time variable t approaches some intermediate value t3 (t1≦t3≦t2) from either direction within the defining time interval.

Figure 13:
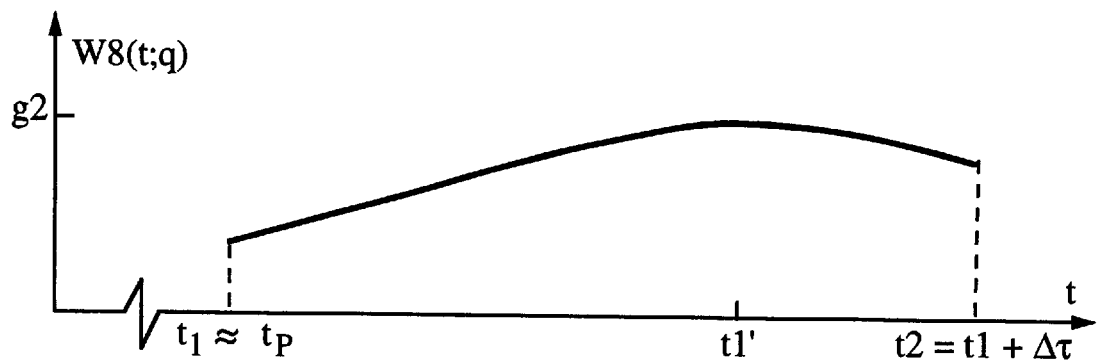
Figure 14:
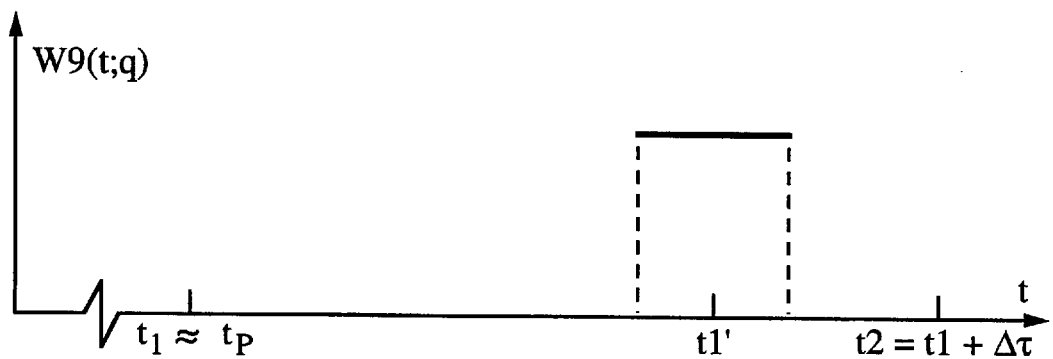

Each of FIGS. 13 and 14 illustrates a non-uniform weighting function, w8(t;q) and w9(t;q), that is an "anti-notch" function, having the form w(t;q)=g0 −w(t;q;notch), where g0 is a constant and w(t;q;notch) is a notch function. An anti-notch function can be used to emphasize, rather than suppress, multipath effects in some situations.

Figure 15:
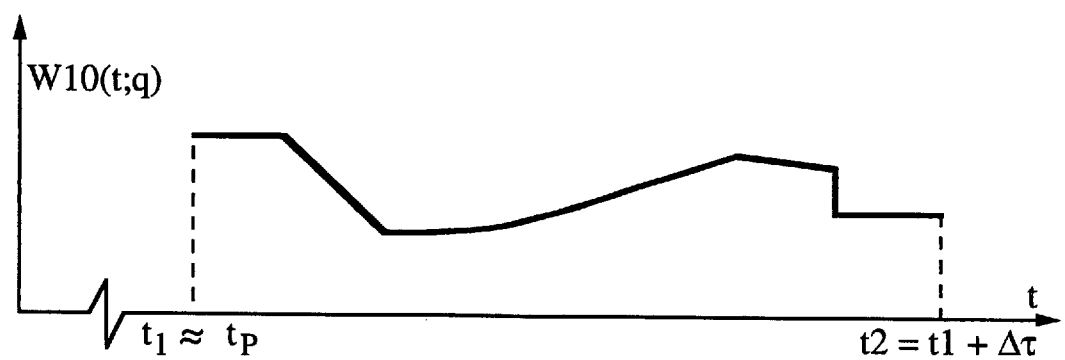
Figure 16:
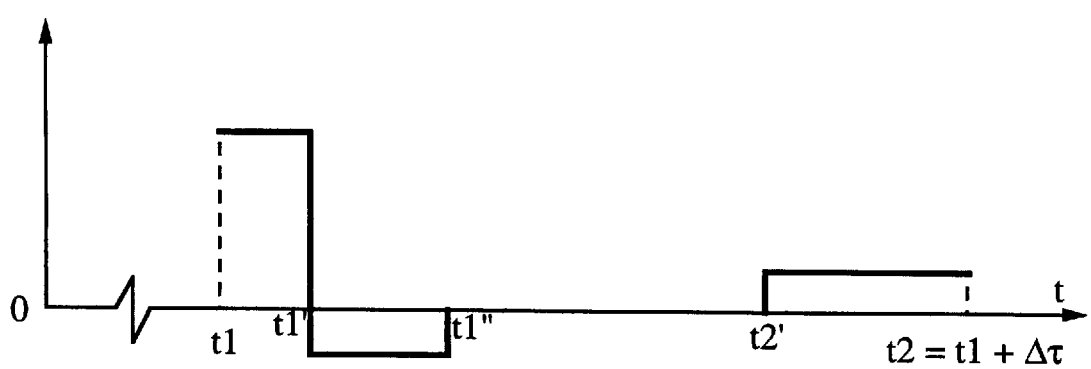

FIG. 15 illustrates another suitable non-uniform weighting function w10(t;q) that is neither a notch function nor an anti-notch function. The non-uniform weighting function w(t;q) need not be non-negative everywhere on the defining interval t1≦t≦t2. FIG. 16 illustrates a suitable non-uniform weighting function w11(t;q) that is positive in some regions and negative in some other regions of the defining interval.

In the preceding analysis, the correlator spacings $\Delta t_{P-E}=t_P-t_E$ and $\Delta t_{L-P}=t_L-t_P$ have been chosen to be equal, for definiteness, but this is not required. It is generally required here that $0<\Delta t_{L-E}=\Delta t_{P-E}+\Delta t_{L-P}<2\Delta \tau_{chip}$.

Figure 17A:
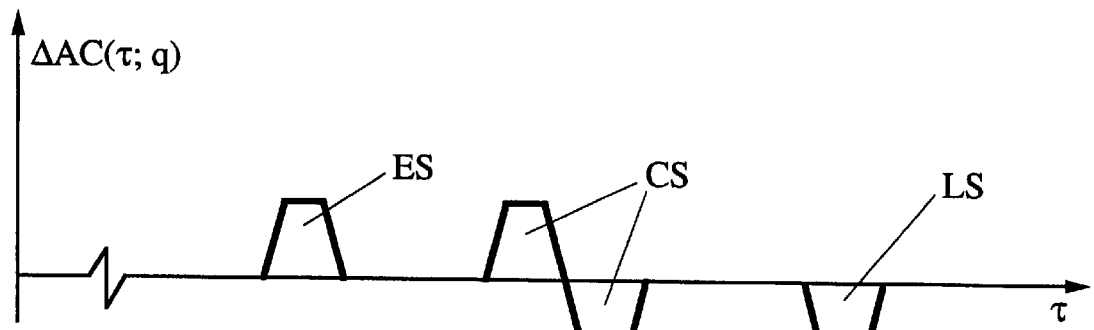
FIGS. 17A and 17B show representative autocorrelation difference functions, before and after application of the invention, respectively.

A multipath signal $S_m(t;\Delta t_m)$, if it is present in an incoming digital composite signal s(t), usually arrives "late," that is, after the direct signal $S_d(t)$ has begun to arrive. FIG. 17A shows an autocorrelation difference function ΔAC(τ;q), using the weighting function w1(t;q) shown in FIG. 5A, before application of the invention. Ideally, after application of the invention ΔAC(τ;q) appears as in FIG. 17B, where the "early spike" ES has been removed, and only the "late spike" LS (which is irrelevant and thus ignored) and the "central spike" CS remain. This is accomplished in the invention by dynamically changing the weighting function used to compute the autocorrelation functions AC(τ;x;qx), depending upon the characteristics of a portion of the incoming digital signal that is presently arriving.

Figure 18A:
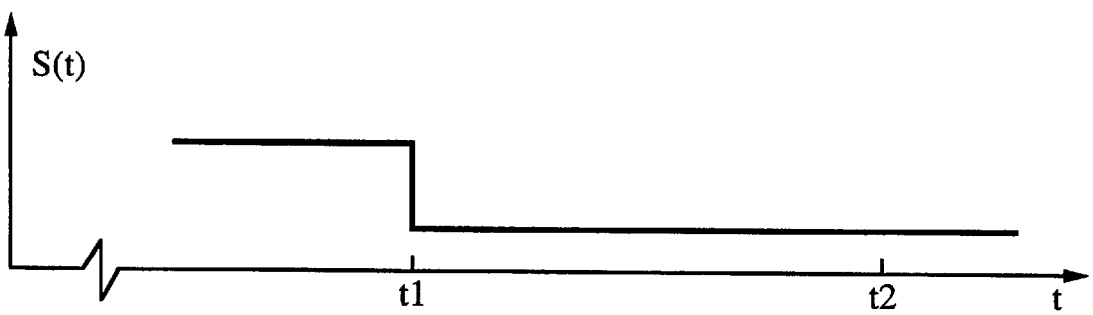
FIGS. 18A, 18B, 18C, 18D and 18E illustrate a weighting function for noise reduction according to the invention.
Figure 18B:
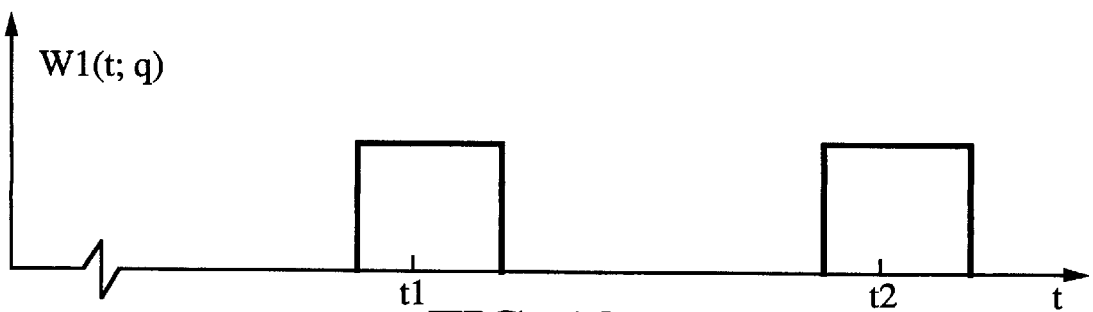
Figure 18C:
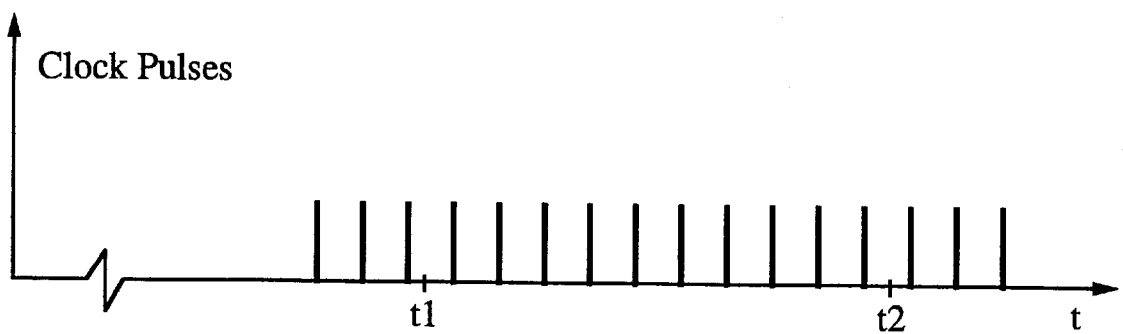
Figure 18D:
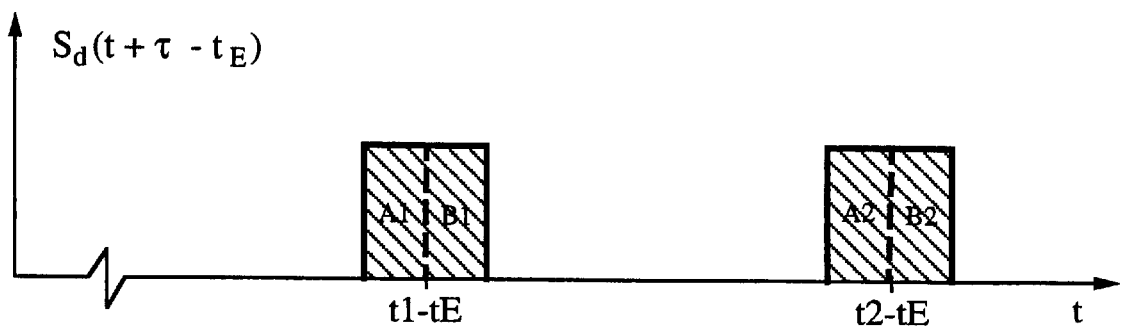
Figure 18E:
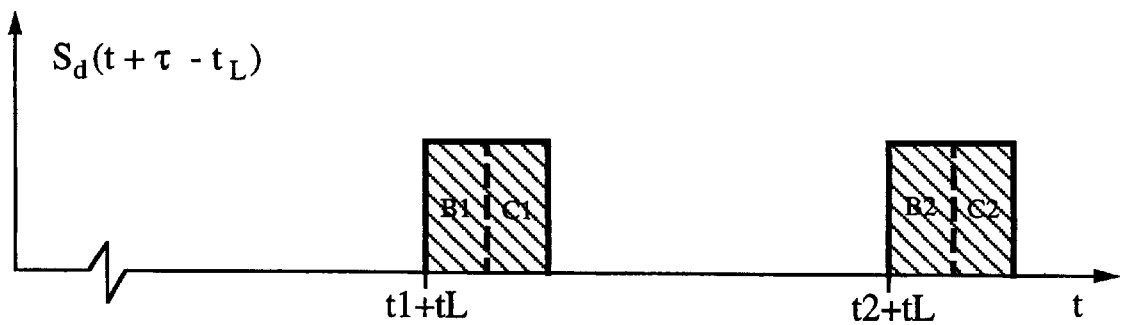

Comparison of consecutive incoming digital signal bit values is useful in reducing the noise associated with computation of the autocorrelation function and the autocorrelation difference function. Where two consecutive incoming digital signal bit values, such as $b_{n-1}$ and $b_n$, differ from each other, a bit value transition has occurred, and useful information is present that is needed to maintain tracking of the incoming digital signal: the signal bit values near t=$t_P$ for both bits should be sampled. Where two consecutive signal bit values coincide, no transition has occurred and no additional useful information is present. Sampling the bit signal values near t=$t_P$ for both bits in this situation will merely introduce additional noise into the computations. A digital direct signal $S_d(t)$, such as the one shown in FIG. 18A, represents the baseband incoming digital direct signal. In FIG. 18A, a bit value transition for $S_d(t)$ occurs near t=t1 but does not occur near t=t2. The non-zero step, of amplitude g1, for the non-uniform weighting function w1(t;q) is two clock pulses wide and overlaps the time interval endpoints t=t1 and t=t2=t1+$\Delta t_{chip}$, as shown in FIG. 18B. A sequence of clock pulses with pulse-to-pulse separation Δt(clock) (usually<$\Delta \tau_{chip}$) is shown in FIG. 18C. The weighting function w1(t;q) is superimposed on each of an early replica and a late replica of the digital direct signal $S_d(t+\tau)$ in FIGS. 18D and 18E, where the correlator spacings satisfy $\Delta t_{P-E}=\Delta t_{L-P}\leq\Delta t(clock)/2$. The weighting function w1(t;q) overlaps the early replica signal domain in the time intervals A1 and B1 and overlaps the late replica signal domain in the time intervals B1 and C1, where a bit value transition occurs in the bit sequence for the incoming digital direct signal $S_d(t)$. The periodic extension of the weighting function w1(t;q) overlaps the early replica signal domain in the time intervals A2 and B2 and overlaps the late replica signal domain in the time intervals B2 and C2, where no bit value transition occurs in the bit sequence for the incoming digital direct signal $S_d(t)$. Let EA and EB (A=A1, A2; B=B1, B2) denote the sampled value of the early replica signal $S_d(t+\tau-t_E)$ in the time intervals A and B, and let LB and LC (B=B1, B2; C=C1, C2) denote the sampled value of the late replica signal $S_d(t+\tau-t_L)$ in the time intervals B and C. Let IA, IB and IC denote the bit values of the incoming digital direct signal $S_d(t)$ in the time intervals A, B and C, respectively.

The contributions to the autocorrelation difference function ΔAC1(τ;q) of the early and late replica signals in the regions A1, B1 and C1 are Δs=g1 EA1 IA1+g1 EB1 IB1−g1 LB1 IB1−g1 LC1 IC1.   (5)

If noise is absent, the value of Δs is zero if the system is tracking perfectly. However, if the system is not tracking perfectly, the value of Δs will be positive or negative. The net result from the difference function formed in Eq. (5) is a positive or negative contribution to ΔAC1(τ;q) from the time intervals A1, B1 and C1 and will indicate whether the value of the tracking variable τ should be increased or decreased to drive the value Δs=Δs(τ) toward zero.

The contributions to the autocorrelation difference function ΔAC1(τ;q) of the early and late replica signals in the regions A2, B2 and C2 are $$\Delta s = g1\ EA2\ IA2 + g1\ EB2\ IB2 - g1\ LB2\ IB2 - g1\ LC2\ IC2 = 0, \quad (6)$$

because no bit value transition occurs in the incoming digital direct signal $S_d(t)$, and thus in the early and late replica signals, in any of the time intervals A2, B2 and C2. The net result from the difference Δs formed in Eq. (6) is zero contribution to ΔAC1(τ;q) from the time intervals A2, B2 and C2. However, noise will contribute to each of the differences formed in Eqs. (5) and (6). For these reasons, if tracking is not perfect, the non-zero contribution of the difference in Eq. (5) to ΔAC1(τ;q), where a bit value transition occurs in the incoming digital direct signal $S_d(t)$, should be included in the computation, but the net zero contribution of the difference in Eq. (6) should not be included. Thus, for narrow correlator spacings, if the contribution of noise to a modified autocorrelation difference function ΔAC1#(τ;q) is to be minimized, the signal product difference $$\Delta s_{E-L}(t) = w1(t+\tau-t_E;q)s(t)S_d(t+\tau-t_E) - w1(t+\tau-t_L;q)s(t)S_d(t+\tau-t_L), \quad (7)$$

which contributes to the integral or sum used to compute the autocorrelation difference function ΔAC1#(τ;q), should be included near a possible signal bit value transition point t≈t1 or t≈t2 only if the bit value transition for the incoming digital direct signal $S_d(t)$ satisfies $$\Delta b_n = 1, \quad (8)$$

for the incoming digital signal at or near that time point, where the bit value change function $\Delta b_n$ is defined by $$\Delta b_n = 1 \quad \text{if} \quad b_{n-1} \neq b_n \quad (9)$$
$$= 0 \quad \text{if} \quad b_{n-1} = b_n.$$

One method of insuring that the contribution of the signal product difference $\Delta s_{E-L}$ to the autocorrelation difference function ΔAC1#(τ;q) is included only from regions where an incoming digital direct signal bit value transition occurs, is to use the weighting function $$w(t_n;q) = w1(t_n;q) \quad \text{if} \quad \Delta b_n = 1, \quad (10A)$$

$$w(t_n;q) = w1^\wedge(t_n;q) \quad \text{if} \quad \Delta b_n = 0, \quad (10B)$$

where w1^(t;q) is a selected weighting function that is different from w1(t;q) and that suppresses the contribution of the signal product difference $\Delta s_{E-L}$ in the time interval $t_n - \Delta\tau_{chip}/2 \leq t < t_n + \Delta\tau_{chip}/2$. One suitable choice is w1^(t;q)=0. This approach will minimize the noise contribution from any region that does not affect location of the zero crossing or tracking point for the autocorrelation difference function ΔAC1(τ;q).

Figure 19:
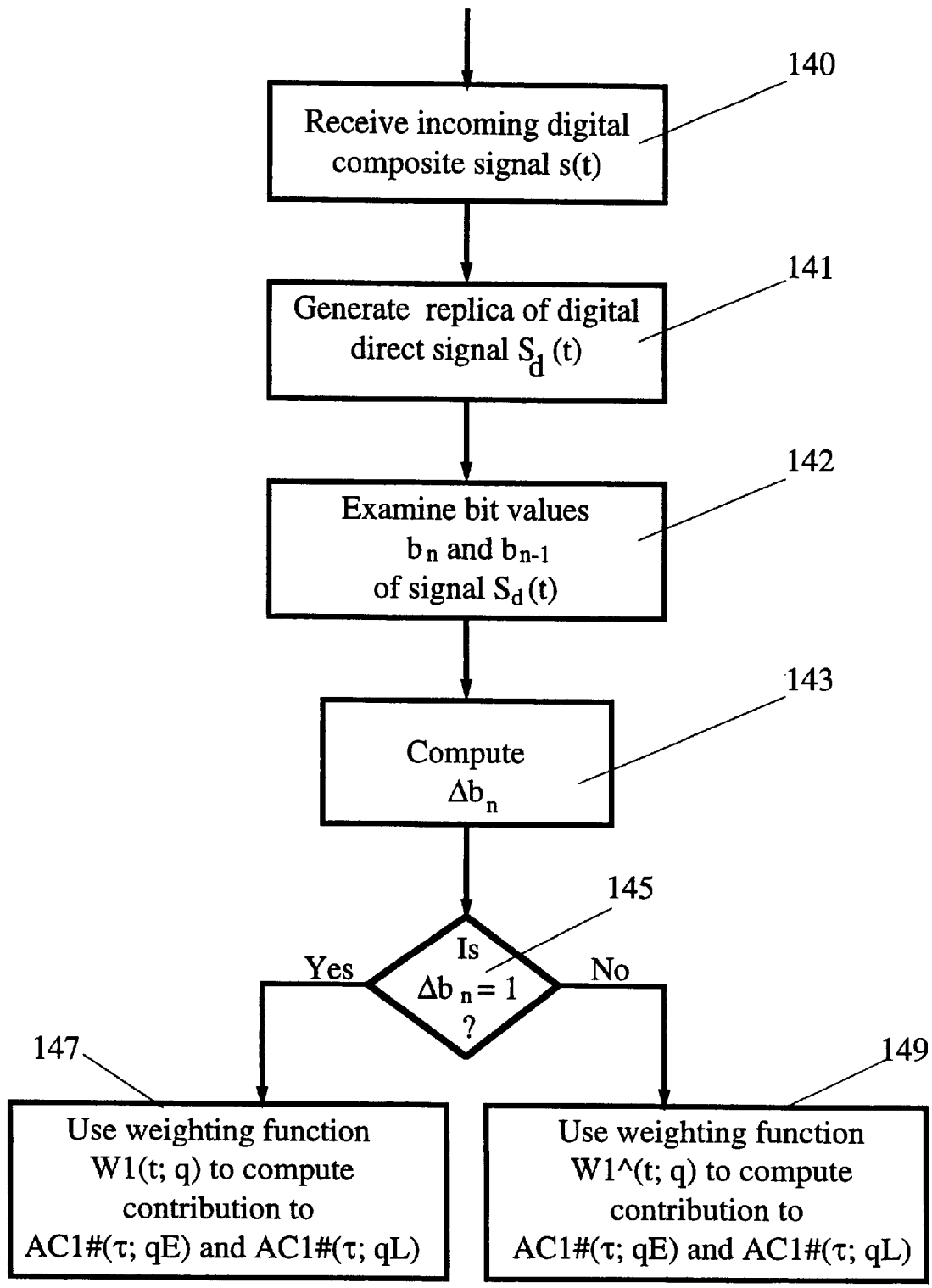
FIG. 19 is a flow chart of one embodiment of a suitable procedure according to the invention.

FIG. 19 is a flow chart illustrating suitable procedural steps that can be taken for analysis of an incoming digital signal according to one embodiment of the invention. In step 140, the incoming digital composite signal s(t) is received. In step 141, a replica of the expected bit sequence for the incoming digital direct signal $S_d(t)$ is generated. In step 142, two consecutive signal bits, with signal bit values $b_{n-1}$ and $b_n$, are received and examined for the digital direct signal $S_d(t)$. In step 143, the bit value change function $\Delta b_n$ is computed. In step 145, the system determines whether $\Delta b_n = 1$. If $\Delta b_n = 1$, a first non-uniform weighting function W1(t;q) is used to compute a contribution to the autocorrelation function AC1#(τ;x;qx) (x=E, P or L) and to an autocorrelation difference function ΔAC1#(τ;q), in step 147, by integration or summation of the quantities W1(t+τ-$t_E$;q) s(t)$S_d$(t+τ-$t_E$) and W1(t+τ-$t_L$;q)s(t)$S_d$(t+τ-$t_L$) over a time interval $I_n$, of length $\Delta\tau_{chip}$ and defined by $$I_n = \{t | t_{n-1} + \Delta < t \leq t_n + \Delta\}, \quad (11)$$

where Δ is a selected time value satisfying $0 \leq \Delta < \Delta\tau_{chip}$. If $\Delta b_n = 0$, a second weighting function W1^(t;q) (not necessarily non-uniform) is used to form a contribution to the autocorrelation function AC1#(τ;x;qx) (x=E, P or L) and the autocorrelation difference function ΔAC1#(τ;q), in step 149, by integration or summation of the quantities W1^(t+τ-$t_E$;q) s(t)$S_d$(t+τ-$t_E$) and W1^(t+τ-$t_L$;q)s(t)$S_d$(t+τ-$t_L$) over the time interval $I_n$.

Comparison of consecutive incoming digital direct signal bit values is also useful in suppressing the multipath signal contribution in computation of the autocorrelation function and the autocorrelation difference function. Where three consecutive incoming digital direct signal bit values, $b_{n-2}$, $b_{n-1}$ and $b_n$, satisfy the conditions $b_{n-2} = b_{n-1} \neq b_n$, a bit value transition ($b_{n-1} \rightarrow b_n$) has occurred, and useful information is present that is needed to maintain tracking of the incoming digital signal: signal bit values for both bits should be sampled. Where $b_{n-1} = b_n$, no transition has occurred and no additional useful information is present. Sampling the bit signal values for both bits in this situation will merely introduce additional noise into the computations. Where $b_{n-2} \neq b_{n-1}$, a bit value transition in the multipath signal, delayed in time by approximately $\Delta\tau_{chip}$ relative to a bit value transition in the corresponding digital direct signal, will appear near the bit value transition point t=$t_n$. Sampling the bit signal values for both bits in this situation will introduce additional multipath noise into the computations. The analysis is similar to the analysis associated with FIGS. 18A–18E. Table 1 indicates the eight possibilities for three consecutive bit values, $b_{n-2}$, $b_{n-1}$ and $b_n$, for an incoming digital direct signal, where $b_n$ is the present bit value and the two consecutive preceding bits (having values $b_{n-2}$ and $b_{n-1}$) have already arrived at the signal receiver.

TABLE 1

| | | | Bit Value Transitions | | |
|---|---|---|---|---|---|
| $b_{n-2}$ | $b_{n-1}$ | $b_n$ | (n-2)-to-(n-1) bit transition occurs | (n-1)-to-n bit transition occurs | Weighting used |
| 0 | 0 | 0 | No | No | w1^ |
| 0 | 0 | 1 | No | Yes | w1 |
| 0 | 1 | 0 | Yes | Yes | w1^ |
| 0 | 1 | 1 | Yes | No | w1^ |
| 1 | 0 | 0 | Yes | No | w1^ |
| 1 | 0 | 1 | Yes | Yes | w1^ |
| 1 | 1 | 0 | No | Yes | w1 |
| 1 | 1 | 1 | No | No | w1^ |

Here, w1(t;g1;t1';t2') is the weighting function shown in FIG. 5A, or some other suitable non-uniform weighting function, and w1^A(t;q) is an alternative weighting function (e.g., w1^(t;q)=0). Other choices of the weighting function w1^(t;q) can be used.

One motivation for this approach is as follows. If a multipath signal $S_m(t;\Delta t_m)$, with corresponding time delay $\Delta t_m$, is present in the incoming digital composite signal s(t), this multipath signal will contribute significantly to computation of an autocorrelation difference function $\Delta AC\#(\tau;q)$ only if the multipath signal delay time satisfies $|\Delta t_m| \leq \Delta \tau_{chip} + \Delta t_{L-E}/2$, where $\Delta t_{L-E} = \Delta t_{P-E} + \Delta t_{L-P}$. If $|\Delta t_m| > \Delta \tau_{chip} + \Delta t_{L-E}/2$, this multipath signal contributes nothing to computation of an autocorrelation difference function $\Delta AC\#(\tau;q)$, because of the nature of pseudorandom sequences.

Figure 17B:
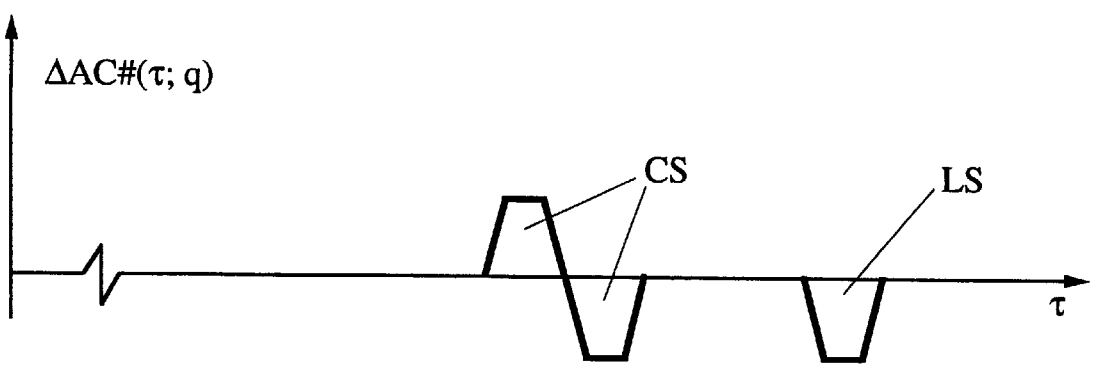

If a bit value transition has not occurred at an immediately preceding bit value transition time (i.e., $b_{n-2} = b_{n-1}$, or $\Delta b_{n-1} = 0$) and a bit value transition occurs at the present bit value transition time (i.e., $b_{n-1} \neq b_n$, $b_n$, or $\Delta b_n = 1$), the contribution of this time interval $I_n$ is emphasized by using the weighting function w1(t;q) to compute the autocorrelation function $AC\#(\tau;x;qx)$. If a bit value transition has occurred at the immediately preceding bit value transition time ($t = t_{n-1}$, where $\Delta b_{n-1} = 1$), a multipath signal $S_m(t;\Delta t_m)$ with an associated time delay $\Delta t_m \approx \Delta \tau_{chip}$ will arrive near the current bit value transition interval ($t \approx t_n$). In this situation, the contribution of this current bit value transition interval $I_n$ to the autocorrelation function $AC\#(\tau;x;qx)$ should be de-emphasized to de-emphasize the signal information arising from the multipath signal bit value transition (with the associated time delay $\Delta t_m \approx \Delta \tau_{chip}$). Here, de-emphasis is achieved by using the weighting function $w1\hat{}(t;q) = 0$. However, any other weighting function $w1\hat{}(t;q)$ that substantially reduces the contribution of the associated time interval $I_n$ to $AC\#(\tau;x;qx)$ (x=E, L) and/or to $\Delta AC\#(\tau;q)$ can be used in place of the weighting function $w1\hat{}(t;q) = 0$. Representative autocorrelation difference functions, $\Delta AC(\tau;q)$ and $\Delta AC\#(\tau;q)$, which would be obtained before and after application of this process, are shown in FIGS. 17A and 17B, respectively.

A formally equivalent approach for identifying the bit value transitions of interest in Table 1 uses the bit value change function $\Delta b_n$ defined in Eq. (9), for the incoming digital signal. The weighting function used for computation of the autocorrelation function $AC\#(\tau;x;qx)$ is selected to be w1(t;q) if $$B_n = (\Delta b_{n-1})^* \cdot \Delta b_n = 1, \tag{12A}$$

and is selected to be $w1\hat{}(t)$ if $$B_n = (\Delta b_{n-1})^* \cdot \Delta b_n = 0, \tag{12B}$$

where b* is the Boolean complement for the binary value b (=0 or 1).

The weighting function w1(t;g1;t1',t2') shown in FIG. 5A can be replaced by any other suitable non-uniform weighting function W1(t;q), such as w2(t;q), w3(t;q), w4(t;q), w5(t;q), w6(t;q), w7(t;q), w8(t;q), w9(t;q), w10(t;q), and w11(t;q) shown in FIGS. 6, 7, 8, 9, 10, 11/12, 13, 14, 15 and 16, respectively. The weighting function $w1\hat{}(t;q)$ can be replaced by any other weighting function $W1\hat{}(t;q)$ that de-emphasizes the corresponding contribution to the autocorrelation function.

Figure 20:
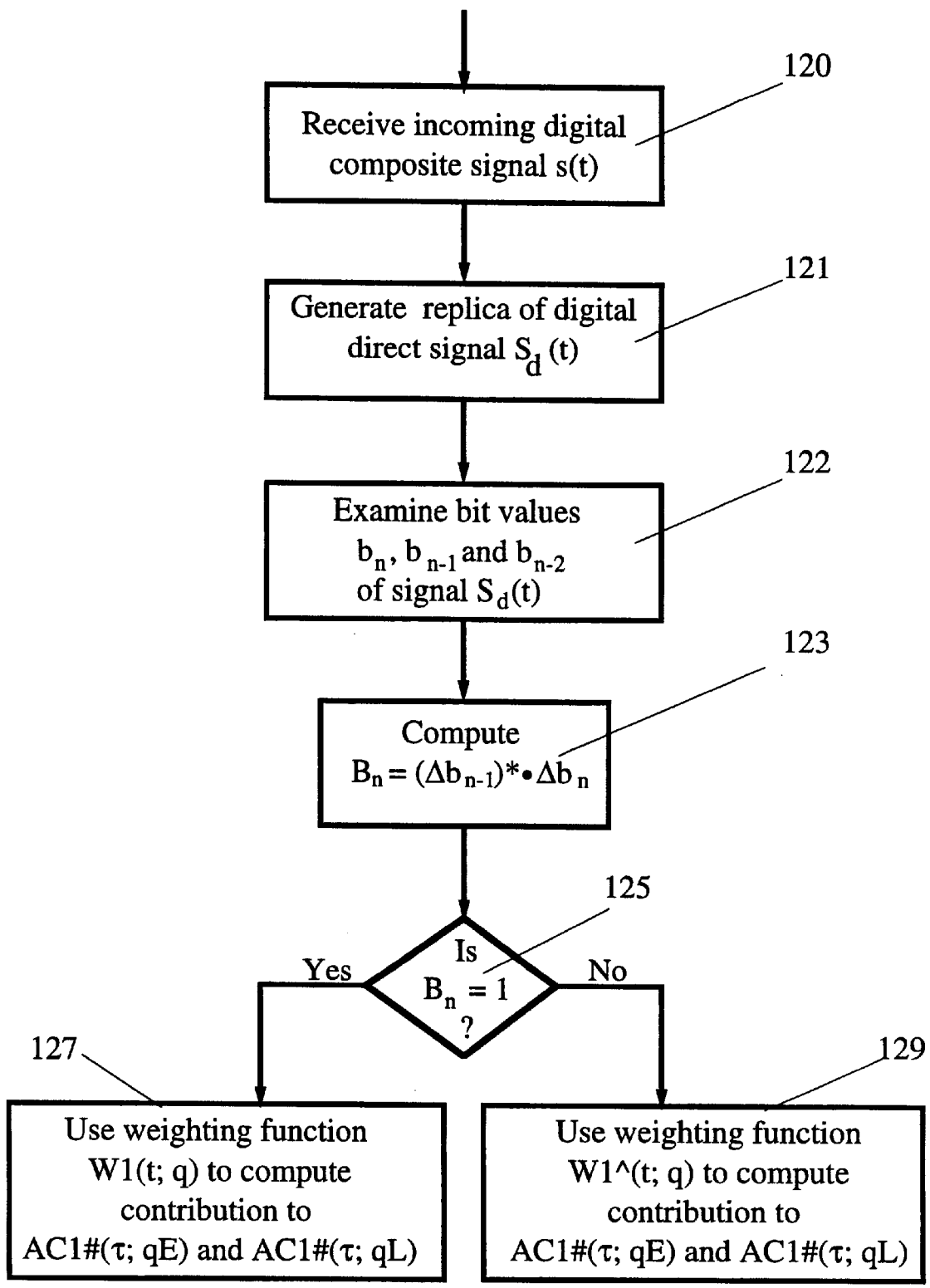
FIG. 20 is a flow chart of a second embodiment of a suitable procedure according to the invention.

FIG. 20 is a flow chart illustrating suitable procedural steps that can be taken for analysis of an incoming digital signal according to one embodiment of the invention. In step 120, the incoming digital composite signal s(t) is received. In step 121, a replica of the incoming digital direct signal $S_d(t)$ is generated. In step 122, three consecutive signal bits, with signal bit values $b_{n-2}$, $b_{n-1}$ and $b_n$, are received for the digital direct signal $S_d(t)$. In step 123, the value of the Boolean function $B_n = (\Delta b_{n-1})^* \cdot \Delta b_n$ is determined. In step 125, the system determines whether $B_n = 1$. If $B_n = 1$, a first non-uniform weighting function W1(t;q) is used to form a contribution to the autocorrelation function $AC1\#(\tau;x;q)$ (x=E, P or L) and to the autocorrelation difference function $\Delta AC1\#(\tau;q)$, in step 127, by integration or summation of the quantities $W1(t+\tau-t_E;q)s(t)S_d(t+\tau-t_E)$ and $W1(t+\tau-t_L;q)s(t)S_d(t+\tau-t_L)$ over the time interval $I_n$. If $B_n = 0$, a second weighting function $W1\hat{}(t;q)$ (uniform or non-uniform) is used to form a contribution to the autocorrelation function $AC1\#(\tau;x;q)$ (x=E, P or L) and the autocorrelation difference function $\Delta AC1\#(\tau;q)$, in step 129, by integration or summation of the quantities $W1\hat{}(t+\tau-t_E;q)s(t)S_d(t+\tau-t_E)$ and $W1\hat{}(t+\tau-t_L;q)s(t)S_d(t+\tau-t_L)$ over the time interval $I_n$.

As a third embodiment, an alternative or adjunct to dynamically changing the weighting function w(t;q) according to the relative bit values $b_{k-2}$, $b_{k-1}$ and $b_k$ (or $b_{k-1}$ and $b_k$) of the incoming digital signal, the periodicity $M_k$ of the weighting function W1(t;q) can be changed dynamically. This alternative is implemented as follows. For any particular time $t \approx t_k$, the periodicity of the weighting function W1(t;q) is defined by $$W1(t;q) = W1(t + n\, M_k\, \Delta \tau_{chip};q) \quad (n = 0, \pm 1, \pm 2, \ldots), \tag{13}$$

where $M_k$ is a positive or negative integer that may vary with the time interval ($t \approx t_k$) within which the time variable t is found. Where $\Delta b_k = 1$ (first embodiment) or $B_k = 1$ (second embodiment), the choice $M_k = 1$ is appropriate in Eq. (13); when $\Delta b_k = 0$ (first embodiment) or $B_k = 0$ (second embodiment), the choice $|M_k| > 1$ is appropriate. In both situations, the same weighting function, such as w1(t;q) shown in FIG. 5A, is used, but with two or more different periodicities.

Implementation

Figure 21:
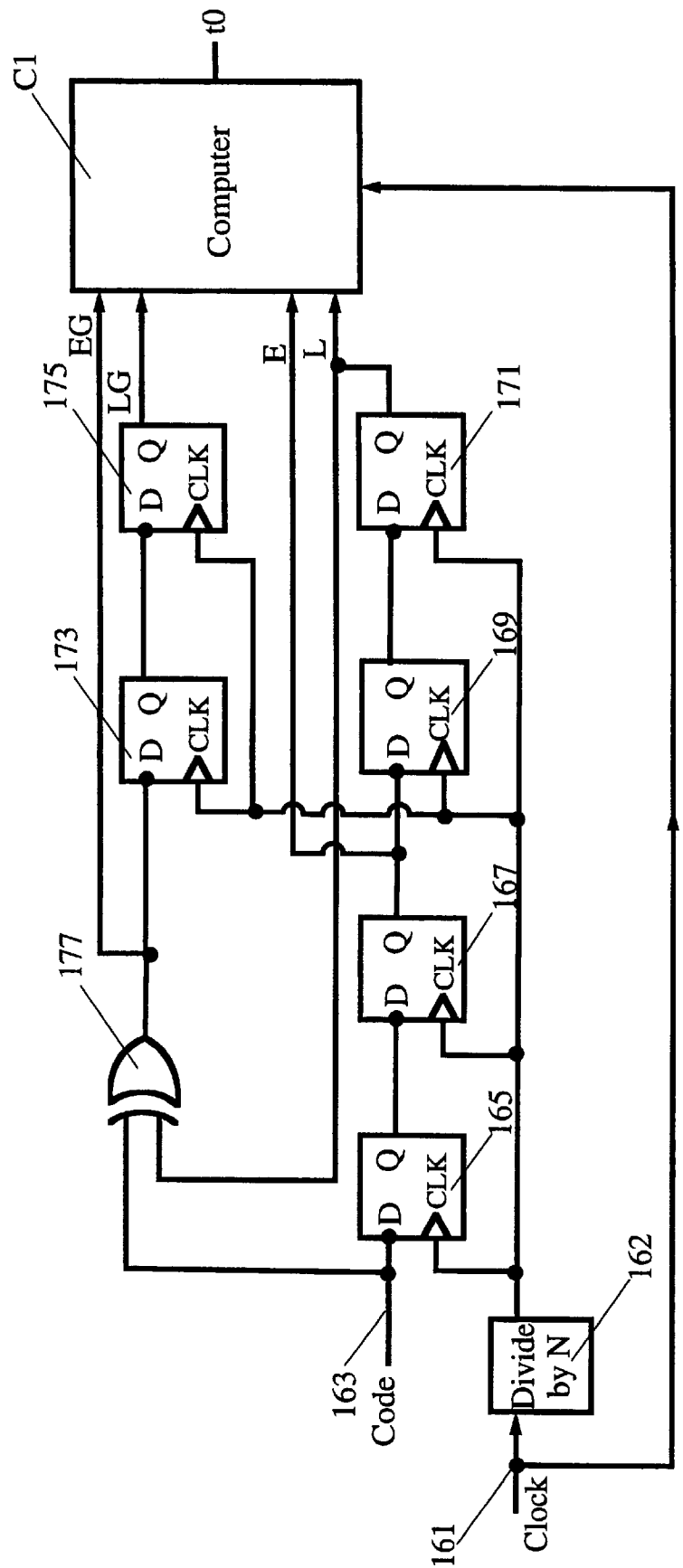
FIGS. 21 and 23 are schematic views of approaches suitable for implementing the two-consecutive-bit and the three-consecutive-bit procedures, respectively.

FIG. 21 illustrates apparatus for implementation of a first embodiment, wherein presence of a bit value transition ($b_{n-1} \neq b_n$) determines whether or not a time interval $I_n$, of length $\Delta \tau_{chip}$ and including the bit value transition time $t = t_n$, is included in the computation for the autocorrelation function $AC1\#(\tau;x;qx)$. A periodic clock pulse signal is provided on a first signal line 161, and a code signal, $Code(t;\tau) = S_d(t+\tau)$, is provided on a second signal line 163. Optionally, the clock pulse signal can be passed through a divide-by-N module 162 that issues a clock pulse after the module 162 has received N consecutive clock pulses on the first signal line 161.

The clock signal is received at the clock input terminal, denoted CLK, of each of a plurality of time delay or "D" flipflops 165, 167, 169, 171, 173 and 175, with the code signal $Code(t;\tau)$ being received at the D input terminal of the first flipflop 165. An output signal issues from the Q terminal of the D fliptlops 165, 167 and 169 and is received at the D input terminals of the D flipflops 167, 169 and 171, respectively. The output signals from the Q output terminals of the D flipflops 167, 169 and 171 are denoted "E", "P" and "L", respectively. The code signal and the output signal from the Q output terminal of the flip flop 171 are received at two input terminals of an EXclusive OR ("XOR") gate 177. The output signal $Code(t;\tau) \oplus L(t)$ from the XOR gate 177 is received at the D input terminal of the flipflop 173 and also serves as a gating signal, denoted "EG." The output signal from the Q output terminal of the flip flop 173 is received at the D input terminal of the flipflop 175, and the output signal from the flipflop 175 serves as a second gating signal, denoted "LG." The gating signals EG(t) and LG(t) serve as enable signals for the early and late correlation signals, respectively. That is, if the enable signal is low or "false,"

the correlator does not accumulate the present contribution to the autocorrelation function AC1#(τ;q); and if the enable signal is high or "true," the correlator does accumulate the present contribution to the autocorrelation function AC1# (τ;q). The various output signals from the flipflops and the XOR gate 177 can be expressed mathematically by the relations $$E(t)=Code(t-2\Delta t;\tau), \tag{14B}$$

$$L(t)=Code(t-4\Delta t;\tau), \tag{14C}$$

$$EG(t)=XOR(t)=Code(t;\tau)\oplus L(t), \tag{14D}$$

$$LG(t)=XOR(t-2\Delta t), \tag{14E}$$

where Code(t;τ) is the instantaneous signal that appears on the code line 163 and Δt=Δt(clock) is the minimum period of the clock pulse appearing on the clock line 161. Table 2 sets forth the output signal values of the flipflops and the XOR gate for some sequences of code signals.

TABLE 2

Output Signals For Two-consecutive-bit Scheme

| Code(t;τ) | E(t) | P(t) | L(t) | XOR(t) = EG(t) | LG(t) |
|---|---|---|---|---|---|
| 0 | 0 | 0 | 0 | 0 | 0 |
| 1 | 0 | 0 | 0 | 1 | 0 |
| 1 | 0 | 0 | 0 | 1 | 0 |
| 1 | 1 | 0 | 0 | 1 | 1 |
| 1 | 1 | 1 | 0 | 1 | 1 |
| 1 | 1 | 1 | 1 | 0 | 1 |
| 1 | 1 | 1 | 1 | 0 | 1 |
| 1 | 1 | 1 | 1 | 0 | 0 |
| . . . | | | | | |
| 0 | 1 | 1 | 1 | 1 | 0 |
| 0 | 1 | 1 | 1 | 1 | 0 |
| 0 | 0 | 1 | 1 | 1 | 1 |
| 0 | 0 | 0 | 1 | 1 | 1 |
| 0 | 0 | 0 | 0 | 0 | 1 |
| 0 | 0 | 0 | 0 | 0 | 1 |
| 0 | 0 | 0 | 0 | 0 | 0 |
| . . . | | | | | |
| 1 | 0 | 0 | 0 | 1 | 0 |

The notation ". . ." indicates that the present line in Table 2 will be identical to the preceding line, unless and until the code signal Code(t;τ) changes.

Returning to FIG. 21, a digital computer C1 receives the clock pulse signals on the signal line 161 and receives the signals $E(t)=S_d(t+\tau-t_E)$, $L(t)=S_d(t+\tau-t_L)$, EG(t) and LG(t). A memory for the computer C1 contains a weighting functions w(t;E;qE) and w(t;L;qL), which may be the same or may differ from each other. The computer C1 provides a sequence of two or more sampling times $t=t_k$ (k=1, 2, 3, . . . ) for an incoming signal that has been frequency converted to baseband, s(t). For a given sampling time $t=t_k$, the computer C1 examines the incoming signals $EG(t_k)$ and $LG(t_k)$. If the value of $EG(t_k)$ is high, the computer computes a first signal product $w(t_k+\tau;E;qE)S_d(t_k+\tau)s(t_k)$ and adds this to a first accumulated integral or sum that will become the early autocorrelation function AC(τ;E;qE), when fully accumulated. If the value of $EG(t_k)$ is low, the value 0 is added to the first accumulated integral or sum for the sampling time $t_k$. If the value of $LG(t_k)$ is high, the computer computes a second signal product $w(t_k+\tau;L;qL)S_d(t_k+\tau)s(t_k)$ and adds this to a second accumulated integral or sum that will become the late autocorrelation function AC(τ;L;qL), when fully accumulated. If the value of $LG(t_k)$ is low, the value 0 is added to the second accumulated integral or sum for the sampling time $t_k$. The computer C1 computes the difference ΔAC(τ;qE;qL)=AC(τ;L;qL)−AC(τ;E;qE) and determines a value τ=t0 for which ΔAC(t0;qE;qL) changes sign or passes through the value 0. The computer C1 interprets the value t0 as a time at which the desired signal $S_d(t)$, relatively free of the presence of any accompanying multipath signals, arrived at the signal antenna or receiver.

Figure 22D:
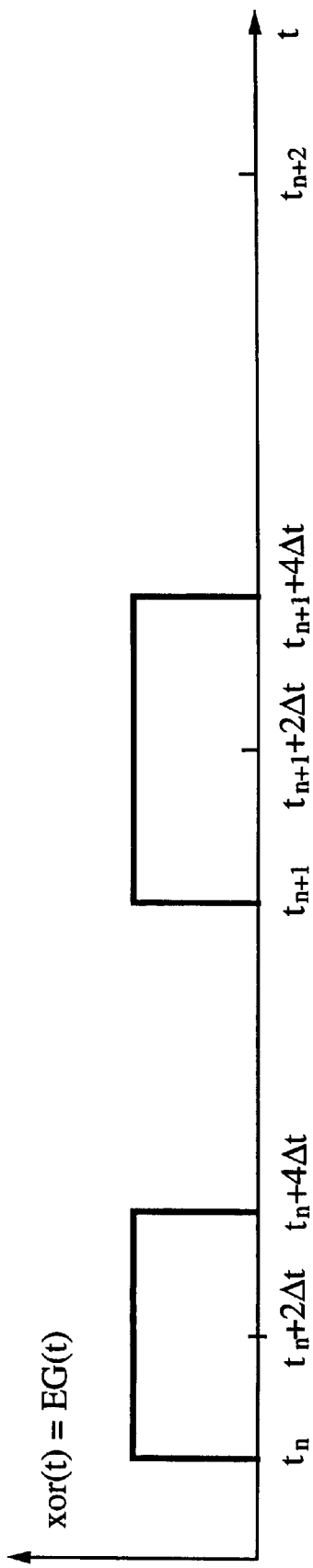
Figure 22E:
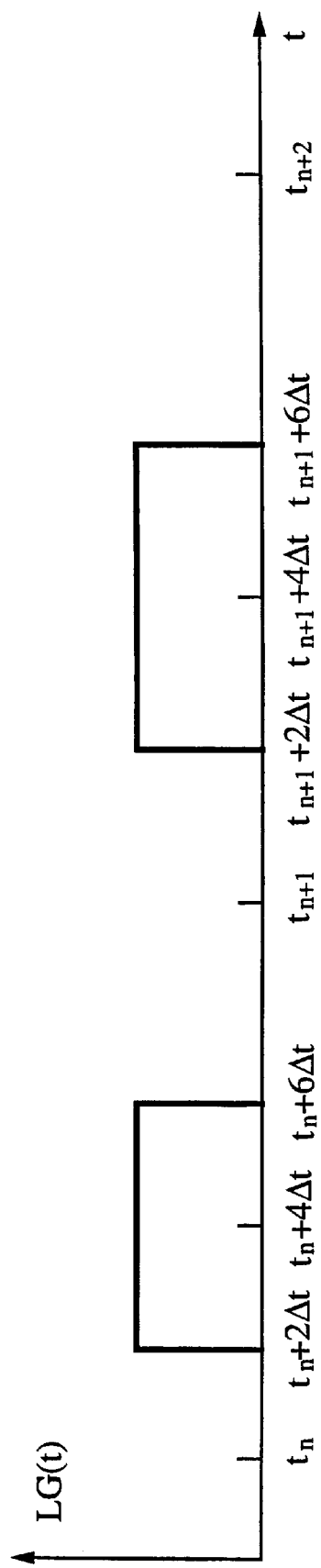

FIGS. 22A, 22B, 22C, 22D and 22E are contemporaneous timing diagrams illustrating how the apparatus shown in FIG. 21 operates where a bit value transition (0→1) occurs at a time $t=t_n$ ($b_{n-1} \neq b_n$), where a second bit value transition (1→0) occurs at a second time $t=t_{n+1}$ ($b_n \neq b_{n+1}$), and where a bit value transition does not occur at a third time $t=t_{n+2}$ ($b_{n+1}=b_{n+2}$). In FIG. 22A, a bit value transition in the code signal Code(t;τ) occurs at time $t=t_n$. An early replica signal E(t) and a late replica signal L(t), corresponding to the bit value transition at $t=t_n$, change from 0 (or low) to 1 (or high) at times $t \approx t_n+2\Delta t$ and $t \approx t_n+4\Delta t$, respectively, as shown in FIGS. 22B and 22C. The signal EG(t)=XOR(t) shown in FIG. 22D changes from 0 to 1 at a time $t \approx t_n$ and changes from 1 to 0 at a time $t \approx t_n+4\Delta t$, when the signal L(t) changes from 0 to 1, assuming that the code signal Code(t;τ) has not changed in the time interval $t_n \leq t < t_n+4\Delta t$. The early gating signal EG(t) thus acts as an enable signal for the early signal correlation and is high (EG(t)=1) only during the time interval $t_n \leq t < t_n+4\Delta t$. In a similar manner, the late gating signal LG(t), shown in FIG. 22E, acts as an enable signal for the late signal correlation and is high only during the time interval $t_n+2\Delta t \leq t < t_n+6\Delta t$. For ease of illustration, it is assumed that $t_{n+1}-t_n > 4\Delta t$ here.

At a second time $t=t_{n+1}$, the code signal Code(t;τ) changes from 1 to 0, as shown in FIG. 22A. The early replica signal E(t) and the late replica signal L(t) change from 1 to 0 at the times $t=t_{n+1}+2\Delta t$ and $t=t_{n+1}+4\Delta t$, as shown in FIGS. 22B and 22C, respectively. The early gating signal EG(t) and the late gating signal LG(t), shown in FIGS. 22D and 22E, respectively, become high only during the time intervals $t_{n+1} < t \leq t_{n+1}+4\Delta t$ and $t_{n+1}+2\Delta t < t \leq t_{n+1}+6\Delta t$, respectively. The early gating signal EG(t) and the late gating signal LG(t) thus serve as enable signals for the early signal correlation and the late signal correlation, whenever the signal Code(t;τ) changes from 0 to 1 or from 1 to 0.

At a third time $t=t_{n+2}$ the code signal Code(t;τ) does not change, as shown in FIG. 22A, over a time interval of length, say, greater than 4Δt. During this last time interval, Code (t;τ), E(t) and L(t) have the same value (0 or 1) so that XOR(t)=Code(t;τ)⊕L(t) is 0 over this time interval, as are the gating signals EG(t) and LG(t). The early and late enable signals remain low (0) in this situation, as should occur where no bit value transition occurs.

Figure 23:
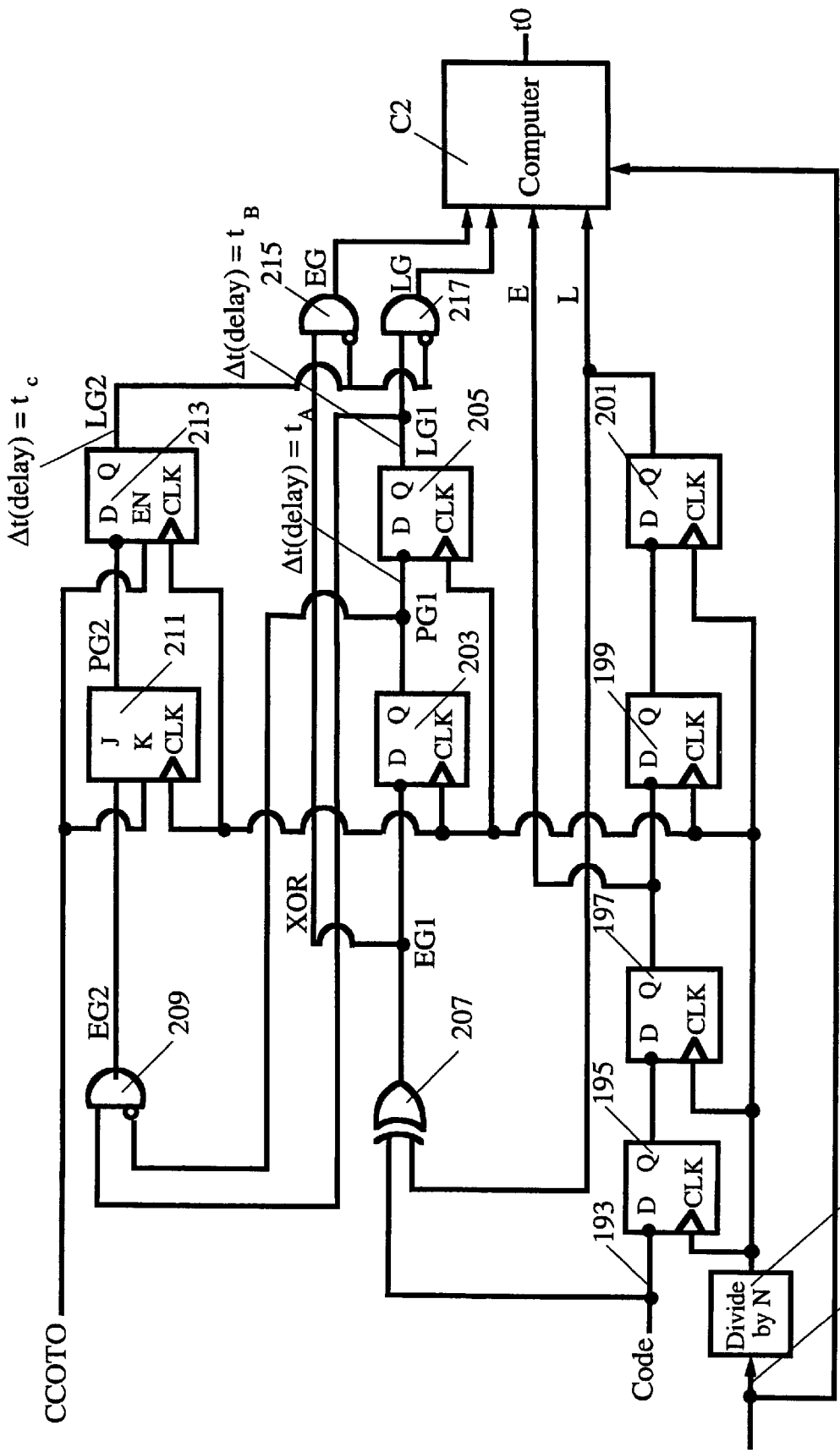

FIG. 23 illustrates apparatus for implementation of the second (three-bit transition) embodiment, wherein the value of $B_n=(\Delta b_{n-1})^* \cdot \Delta b_n$ determines whether or not the interval $I_n$ is included in the computation for the autocorrelation function AC1#(τ;x;qx). A periodic clock pulse signal is provided on a first signal line 191, and a code signal, $Code(t;\tau)=S_d(t+\tau)$, is provided on a second signal line 193. The clock signal is received at the clock input terminal, denoted CLK, of each of a plurality of time delay or "D" flipflops 195, 197, 199, 201, 203, 205 and 213 and at a JK flipflop 211. The code signal is received at the D input terminal of the first flipflop 195. An output signal issues from the Q terminal of the D flipflops 195, 197 and 199 and is received at the D input terminals of the D fliptlops 197, 199 and 201, respectively. The output signals from the Q output terminals of the D fliptlops 197, 199 and 201 are denoted "E", "P" and "L", respectively. Optionally, a divide-by-N module 192 is included for the clock pulse signals.

The code signal and the output signal from the Q output terminal of the flip flop 201 are received at two input terminals of an EXclusive OR ("XOR") gate 207. The output signal Code(t;τ)⊕L(t) from the XOR gate 207 is received at the D input terminal of the flipflop 203. The output signal from the Q output terminal of the flip flop 203 is received at the D input terminal of the flipflop 205. The output signal from the flipflop 203 is also received and inverted at a first input terminal of an AND gate 209. The output signal from the flipflop 205 is received at a second input terminal of the AND gate 209. The output signal from the AND gate 209 is received at the "J" input terminal of a JK flipflop 211, and the "K" input terminal receives a CCOTO signal, which is discussed below. The output signal from the JK flipflop 211 is received at the D input terminal of a D flipflop with enable 213 (referred to here as a D/EN flipflop).

The output signal from the XOR gate 207 and the inverted output signal from the flipflop 213 are received at two input terminals of an AND gate 215, whose output signal is a first gating signal, denoted "EG." The output signal from the flipflop 205 and the inverted output signal from the flipflop 213 are received at two input terminals of an AND gate 217, whose output signal is a second gating signal, denoted "LG." A table of value assignments similar to that shown in Table 2 is easily set down for the apparatus in FIG. 23.

Figure 24A:
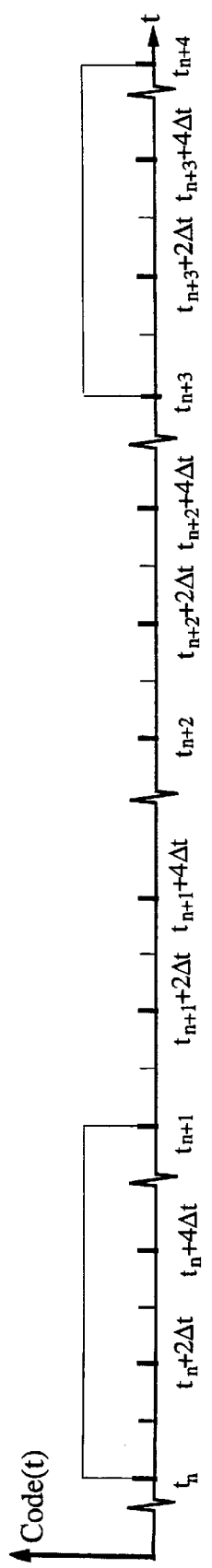
Figure 24B:
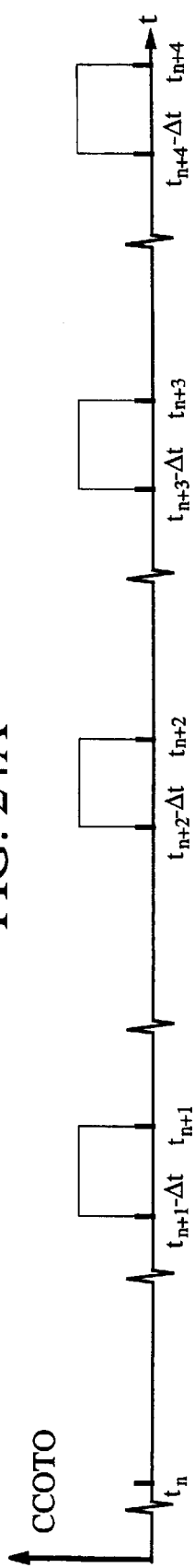
Figure 24C:
Figure 24D:
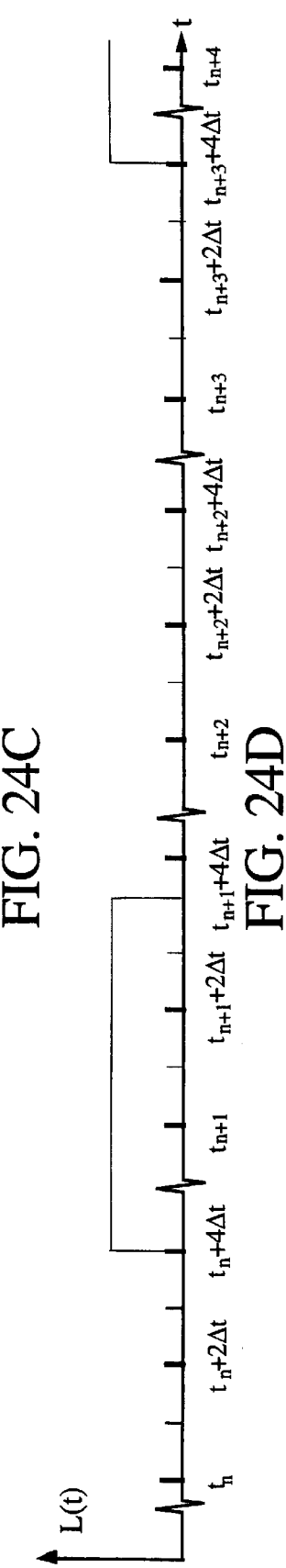
Figure 24E:
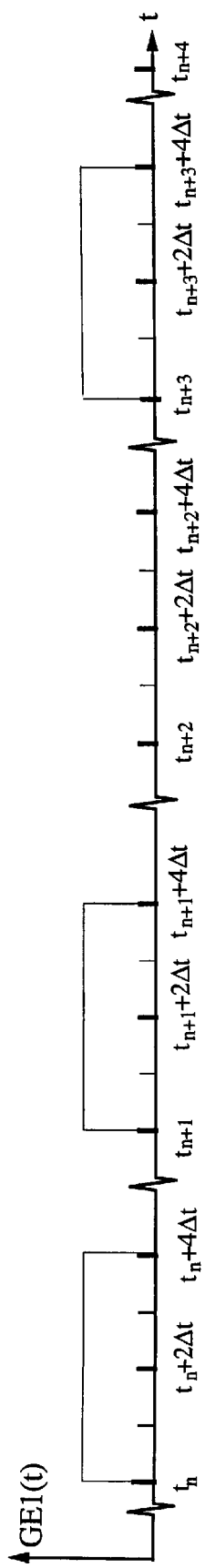
Figure 24F:
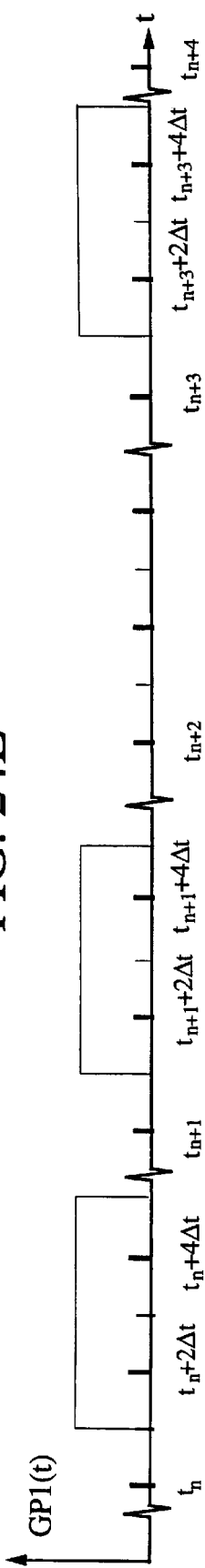
Figure 24G:
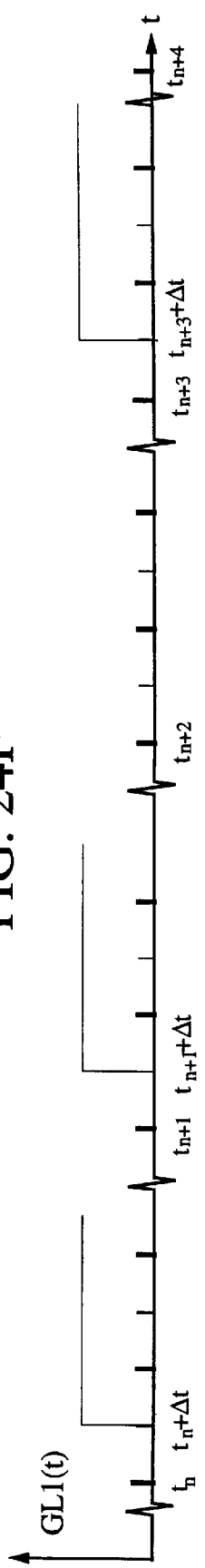
Figure 24H:
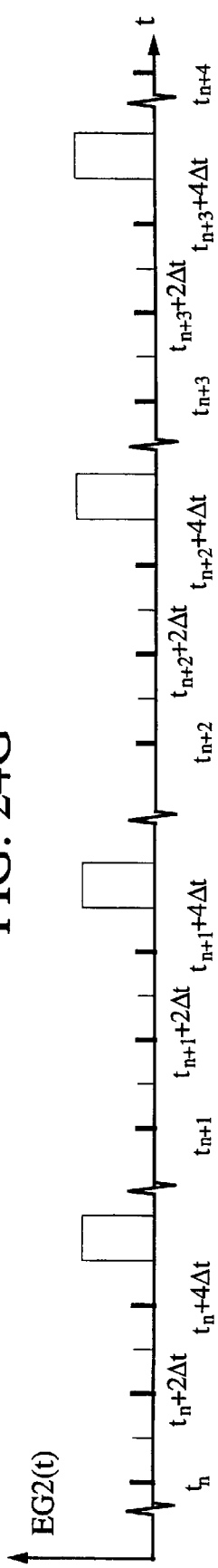
Figure 24I:
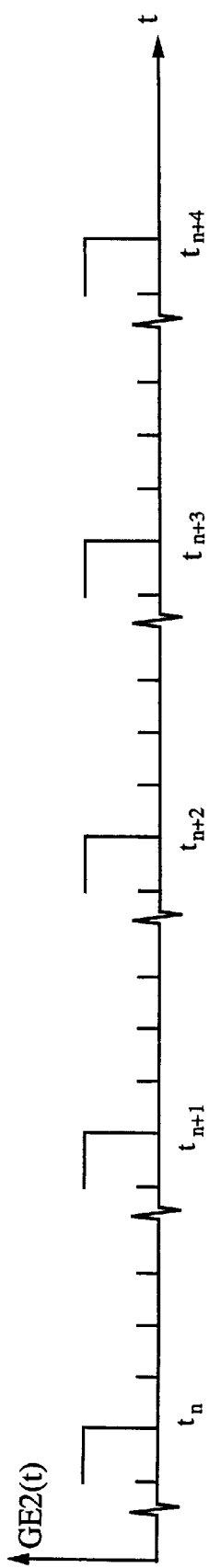
Figure 24J:
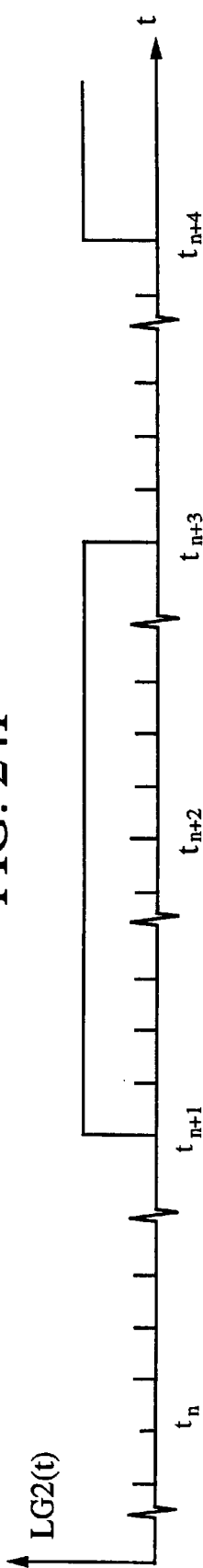
Figure 24K:
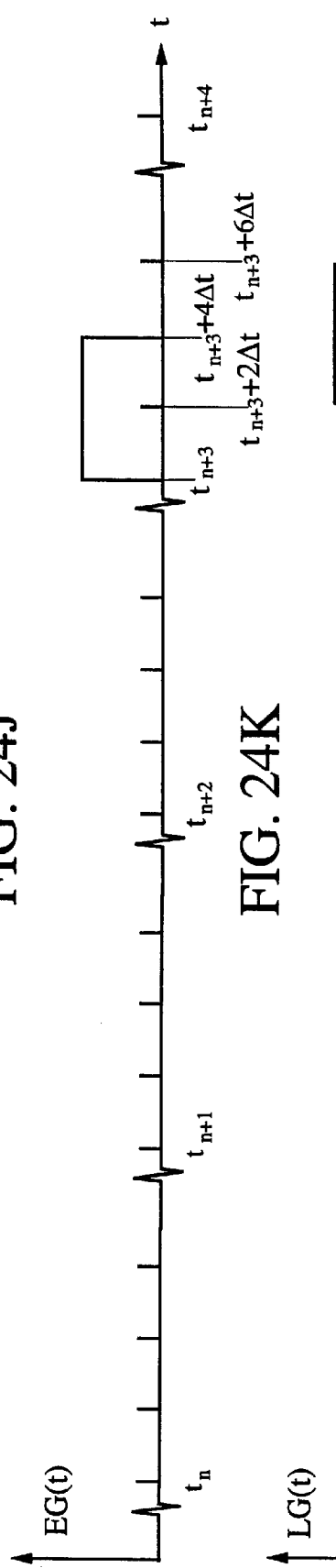
Figure 24L:

FIGS. 24A–24L are contemporaneous timing diagrams illustrating how the apparatus shown in FIG. 23 operates where a bit value transition (0 →1 or 1→0) occurs in the code signal Code(t;τ) at times t=$t_n$ ($b_{n-1} \neq b_n$), t=$t_{n+1}$ ($b_n \neq b_{n+1}$), t=$t_{n+3}$ ($b_{n+2} \neq b_{n+3}$) and t=$t_{n+4}$ ($b_{n+3} \neq b_{n+4}$), and does not occur at times t=$t_{n+2}$ ($b_{n+1}=b_{n+2}$) and t=$t_{n+5}$ ($b_{n+4}=b_{n+5}$), as shown in FIG. 24A. For ease of illustration, it is assumed that $t_{n+1}-t_n=\Delta t_{chip}>6\Delta t$. FIG. 24B illustrates the signal CCOTO(t), which is defined by $$CCOTO(t) = 1 \quad (t_r - \Delta t \leq t < t_r) \quad (15B)$$
$$= 0 \quad (t_r \leq t < t_{r+1} - \Delta t; r = 1, 2, ...)$$

The CCOTO signal goes high one clock pulse interval before each chip transition time occurs (at t=$t_r-\Delta t$), for one clock pulse interval, and is low at all other times. This particular choice is used for illustrative purposes in FIGS. 23 and 24B. Other choices of the CCOTO signal can also be used, with appropriate changes in the apparatus shown in FIG. 23. The signals $$E(t) = Code(t - 2\Delta t; \tau), \quad (15C)$$

$$L(t) = Code(t - 4\Delta t; \tau), \quad (15D)$$

$$EG1(t) = Code(t; \tau) \oplus L(t), \quad (15E)$$

$$PG1(t) = EG1(t - \Delta t), \quad (15F)$$

$$LG1(t) = EG1(1 - 2\Delta t), \quad (15G)$$

$$EG2(t) = LG1(t) \cdot PG1(t)^*, \quad (15H)$$

$$PG2(t) = F_{J,K}(EG2(t), CCOTO(t)), \quad (15I)$$

$$LG2(t) = F_{D,EN}(PG2(t), CCOTO(t)), \quad (15J)$$

$$EG(t) = EG1(t) \cdot LG2(t)^*, \quad (15K)$$

$$LG(t) = LG1(t) \cdot LG2(t)^*, \quad (15L)$$

are shown in FIGS. 24C–24L, respectively. The functions $F_{J,K}(f(t), g(t))$ and $F_{D,EN}(f(t), g(t))$ are determined by the output signals for the JK flipflop 211 and for the D/EN flipflop 213, viz.

$$\begin{aligned} F_{J,K}(f(t), g(t)) &= \text{last output state} & (f(t) = 0 \quad g(t) = 0) \\ &= 0 & (f(t) = 0, \quad g(t) = 1) \\ &= 1 & (f(t) = 1, \quad g(t) = 0) \\ &= (\text{last output state})^* & (f(t) = 1, \quad g(t) = 1), \end{aligned} \quad (16)$$

The timing diagrams shown in FIGS. 24A–24L can be verified by analysis similar to that employed for FIGS. 22A–22E. The gating signal EG(t) is high, indicating enablement, only for times in the interval $t_{n+3} \leq t \leq t_{n+3}+4\Delta t$, which includes the only code signal transition point (t=$t_r$ with r=n+3) for which $B_r=(\Delta b_{r-1})^* \cdot \Delta b_r=1$ in FIG. 24A; that is, $B_n=B_{n+1}=B_{n+2}=B_{n+4}=B_{n+5}=0$ in FIG. 24A. Similarly, the gating signal LG(t) is high, indicating enablement, only for times in the interval $t_{n+3}+2\Delta t \leq t \leq t_{n+3}+6\Delta t$.

Returning to FIG. 23, a computer C2 receives the clock pulse signals on the signal line 191 and receives the signals E(t)=$S_d(t+\tau-t_E)$, L(t)=$S_d(t+\tau-t_L)$, EG(t) and LG(t). The computer C2 provides the weighting functions w(t;E;qE) and w(t;L;qL), forms the first and second signal products w($t_k+\tau$;E;qE)$S_d(t_k+\tau)s(t_k)$ and w($t_k+\tau$;L;qL)$S_d(t_k+\tau)s(t_k)$, computes the first and second accumulations AC(τ;E;qE) and AC(τ;L;qL), forms the accumulation difference ΔAC (τ;qE;qL), determines a time shift value τ=t0 at which the accumulation difference changes sign, and interprets the value t0 exactly as does the computer C1 in FIG. 21.

Figure 25:
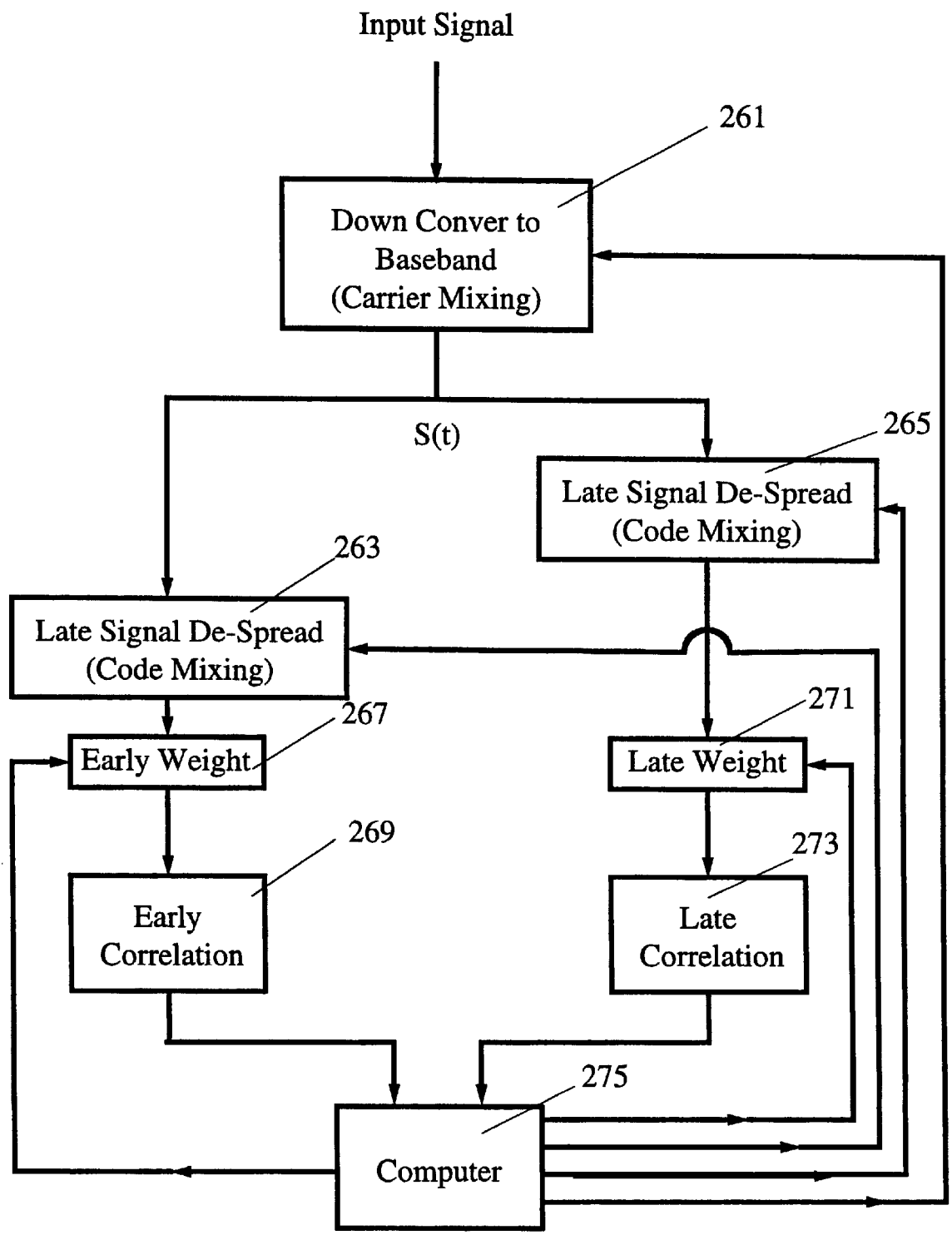
FIG. 25 is a schematic view of other apparatus for practising the invention.

FIG. 25 illustrates more general apparatus for implementation of the various embodiments of the invention. An incoming composite signal is downconverted from an intermediate frequency to a baseband signal and converted to an incoming, digital composite signal s(t), using carrier signal mixing in a baseband conversion module 261, in a well known manner. The incoming digital composite signal s(t) is despread, using code phase mixing to form an early signal product s(t)$S_d(t\tau-t_E)$ in an early signal despread module 263, and using code phase mixing to form a late signal product s(t)$S_d(t+\tau-t_L)$ in a late signal despread module 265. An early weighting function w(t;E;qE) is combined multiplicatively with the early signal product to form a weighted early signal product w(t+τ-$t_E$;E;qE)s(t)$S_d(t+\tau-t_E)$ in an early weighting module 267, and an early signal correlation function is formed in an early correlator 269. A late weighting function w(t;L;qL) is combined multiplicatively with the late signal product to form a weighted late signal product w(t+τ-$t_L$;L;qL)s(t)$S_d(t+\tau-t_L)$ in a late weighting module 271, and a late signal correlation function is formed in a late correlator 273. The early and late correlation signals are received by a computer 275 that determines the direction the time shift variable τ should move to drive the system toward the zero crossing or tracking point. The time shift adjustment information is fed back to the early and late signal despread modules 263 and 265 and to the early weighting and late weighting modules 267 and 271, for use in forming an adjusted early signal product and an adjusted late signal product, and is fed back to the baseband conversion module 261.

Figure 26:
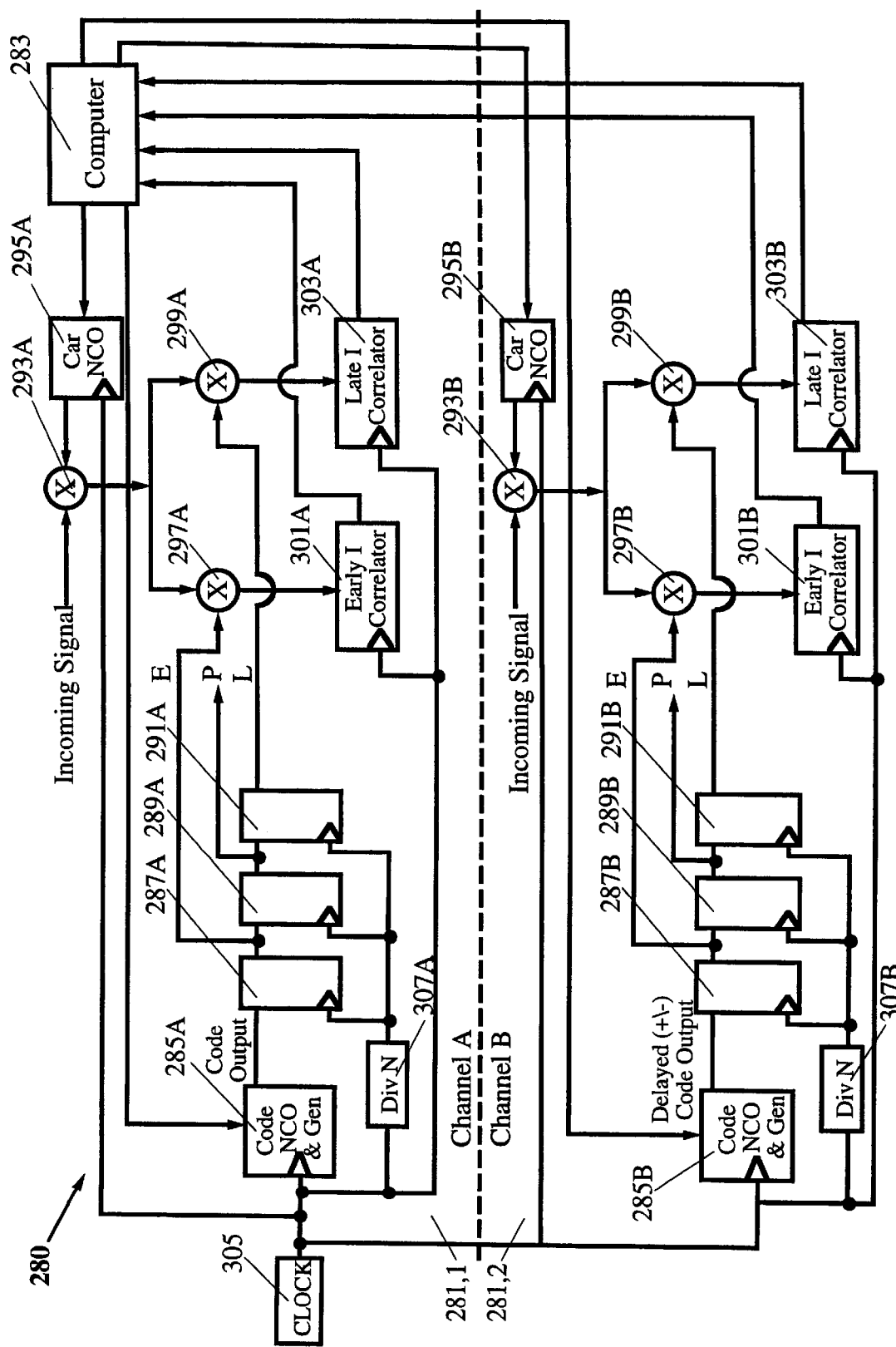
FIG. 26 illustrates an apparatus suitable for implementing a two-consecutive-bit procedure according to the invention, using readily available digital signal processor chips.

FIG. 26 illustrates another apparatus 280 for implementing the invention, where the choice of weighting function is based upon the values of two consecutive bits, $b_{n-1}$ and $b_n$, in the reference signal, using readily available digital signal processor chips. The apparatus 280 includes a first channel 281A, a second channel 281B and a computer 283 and uses weighting functions W1(t;q) such as are shown in FIGS. 5A, 6, 27D and 27E, with W1^(t;q)=0. The apparatus 280 uses early and late weighting functions W(t;E;qE) and W(t;L;qL), which may be the same or may be different, having non-zero values only near the two ends of a time interval width $t1 \leq t < t2$, with periodic extensions as discussed above. The weighting functions W(t;E;qE) and W(t;L;qL) may be chosen, for example, to be step functions as shown in FIGS. 27D and 27E, with the same or different step function widths and the same or different step function gains or amplitudes.

Each channel 281z (z=A, B) has a code phase NCO and generator 285z whose output signal is received by the first of a sequence of three D flipflops 287z, 289z and 291z, each with an associated time delay Δt(clock). An incoming signal I(t) is received by a first input terminal of a first signal multiplier 293z. A second input terminal of the signal multiplier 293z receives a carrier signal from a carrier phase NCO 295z that is controlled by signals received from the computer 283. The carrier signal mixes with the incoming signal to produce a baseband signal. The output signal from the first signal multiplier 293z is received by first input terminals of second and third signal multipliers 297z and 299z. Second input terminals of the signal multipliers 297z and 299z receive the output signals from the first and third D flipflops 287z and 291z, respectively. Output signals from the signal multipliers 297z and 299z are received by an early signal correlator module 301z and a late signal correlator module 303z, respectively. Output signals from the early signal correlator module 301z and late signal correlator module 303 are received by the computer 283 to vary the time shift variable τ that is part of the reference signal $S_d(t+\tau)$ received from the code phase NCO and generator 285z. The code phase NCO 285z, the D flipflops 287z, 289z and 291z, the carrier phase NCO 295z, the early signal correlator module 301z and the late signal correlator module 303z are all driven by a master clock 305. The D flipflop clock signals are optionally passed through a divide-by-Nz module 307z as shown, where NA and NB are independently selectable positive integers The carrier phase NCOs 295A and 295B are run identically. The clock pulse width is Δt(clock).

Figures 27A, 27B, 27C:
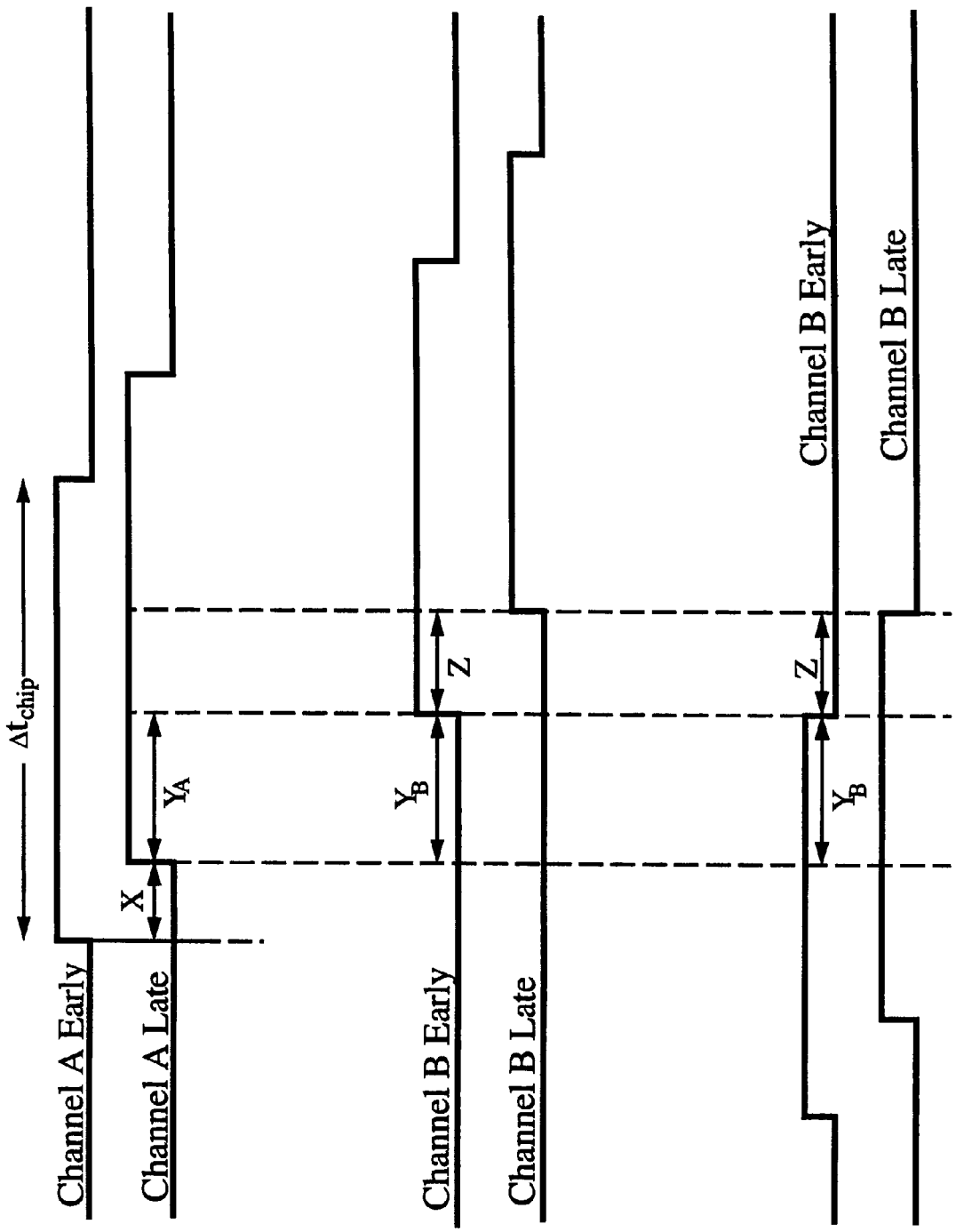
FIG. 27A is a graphical view of early and late replicas of a direct digital signal.
FIG. 27B is a graphical view of early and late replicas of a direct digital signal, time delayed relative to the signals shown in FIG. 27A.
FIG. 27C is a graphical view of early and late replicas of a direct digital signal, time advanced relative to the signals shown in FIG. 27A.
Figure 27D:
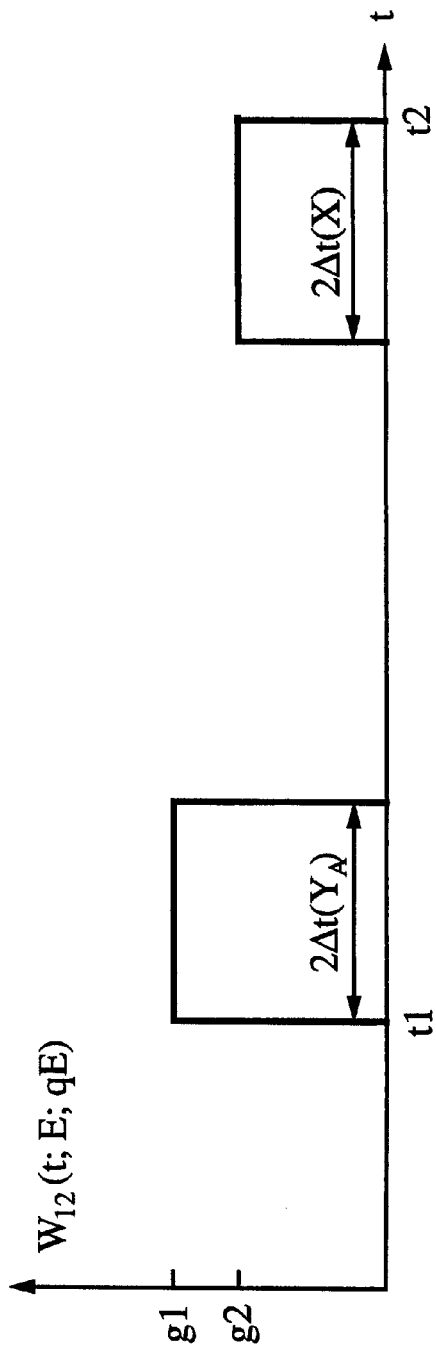
FIGS. 27D and 27E are graphical views of early and late weighting functions obtained from combining uniformly weighted correlators.
Figure 27E:
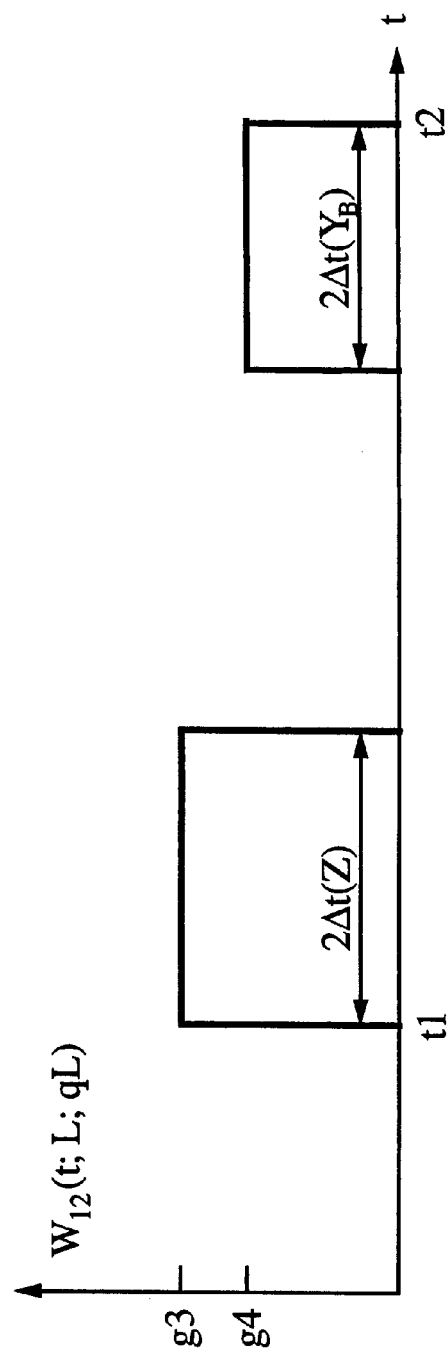

In one preferred embodiment, the code phase NCO 285B in the second channel 281B has a selected positive time delay $\Delta t(B-A)=\tau_B-\tau_A>0$ relative to the code phase NCO 285A in the first channel 281A, as indicated by a comparison of FIGS. 27A and 27B. In another preferred embodiment, the code phase NCO 285B in the second channel 281B has a selected negative time delay $\Delta t(B-A)=\tau_B-\tau_A<0$ (that is, an advancement) relative to the code phase NCO 285A in the first channel 281A, as indicated by a comparison of FIGS. 27A and 27C.

Four time regions are identified from FIGS. 27A, 27B and 27C, corresponding to the four regions for the weighting functions shown in FIGS. 27D and 27E. A first region X, of temporal width Δt(X), spans the separation between the early and late signals for the channel 281A. A second region Z, of temporal width Δt(Z), spans the separation between the early and late signals for the channel 281B. A third region YA, of temporal width Δt(YA), spans the separation between the late signal in the channel 281A and the early signal in the channel 281B. A fourth region YB, of temporal width Δt(YB)=Δt(YA), spans the separation between the early signal in the channel 281B and the late signal in the channel 281A. The temporal widths are $$\Delta t(X) = \Delta t_{L-E,A}, \quad (18)$$

$$\Delta t(Z) = \Delta t_{L-E,B}, \quad (19)$$

$$\Delta t(YA) = \Delta t(YB) = (t_{E,B} - t_{L,A}). \quad (20)$$

The weighting functions w12(t;x;qx) (x=E,L) used in the time-delayed version or time-advanced version illustrated in FIGS. 27A, 27B and 27C are constructed as follows. Define a square wave function by the relations $$SQ(t; ta; tb) = 1 \quad (ta < t < tb) \quad (21)$$
$$= 0 \quad (t1 \leq t < ta, \text{ or } tb \leq t \leq t2)$$

where $t1 \leq ta < tb \leq t2$. The weighting functions w12(t;x;qx) (x=E,L) used in the time-delayed embodiment in FIGS. 27A and 27B are defined by $$w12(t;E;qE) = g1 \cdot SQ(t1;t1+\Delta t(YA)) + g_2 \cdot SQ(t2-\Delta t(X);t2), \quad (22)$$

$$w12(t;L;qL) = g3 \cdot SQ(t1;t1+\Delta t(Z)) + g4 \cdot SQ(t2-\Delta t(YB);t2). \quad (23)$$

The autocorrelation difference function ΔAC(τ;qE;qL) is then computed, for $\tau=\tau_A$ or $\tau_B$, as the integral, or sum of sampled values, of the difference $$\Delta s_{E-L}(t) = w12(t+\tau-t_E;E;qE)S_d(t+\tau-t_E)s(t) - w12(t+\tau-t_L;L;qL)S_d(t+\tau-t_L)s(t), \quad (24)$$

over a suitable time interval $0 \leq t \leq T$ that contains the time interval $t1 \leq t \leq t2$, with $t2-t1=\Delta \tau_{chip}$.

The square wave functions SQ(t;ta;tb) used in Eqs. (22) and (23) are obtained from uniform weighting correlations, such as shown in FIGS. 27A and 27B, by the following linear combinations of correlation values.

$$SQ(\tau;t1;t1+\Delta t(YA)) = \{AC0(\tau_A;L) - AC0(\tau_B;E)\}/2, \quad (25)$$

$$SQ(\tau;t2;t2-\Delta t(X)) = \{AC0(\tau_A;L) - AC0(\tau_A;E)\}/2, \quad (26)$$

$$SQ(\tau;t1;t1+\Delta t(Z)) = \{AC0(\tau_B;E) - AC0(\tau_B;L)\}/2, \quad (27)$$

$$SQ(\tau;t2;t2-\Delta t(YB)) = -\{AC0(\tau_A;L) - AC0(\tau_B;E)\}/2 \quad (28)$$

Proceeding in a similar manner, the weighting functions w12(t;x;qx) (x =E,L) used in the time-advanced embodiment in FIGS. 27A and 27C are computed as set forth in Eqs. (22) and (23) for the time-delayed embodiment. The square wave functions SQ(t;ta;tb) are obtained for the time-advanced embodiment from the following linear combinations of correlation values.

$$SQ(\tau;t1;t1+\Delta t(YA)) = \{AC0(\tau_A;L) + AC0(\tau_B;E)\}/2, \quad (29)$$

$$SQ(\tau;t2;t2-\Delta t(X)) = \{AC0(\tau_A;L) - AC0(\tau_A;E)\}/2, \quad (30)$$

$$SQ(\tau;t1;t1+\Delta t(Z)) = -\{AC0(\tau_B;E) - AC0(\tau_B;L)\}/2, \quad (31)$$

$$SQ(\tau;t2;t2-\Delta t(YB)) = -\{AC0(\tau_A;L) + AC0(\tau_B;E)\}/2. \quad (32)$$

The digital reference function $S_d(t+T_y-t_x)$ (x=E,L; y=A, B) used to compute the autocorrelation functions AC0($\tau_y$;x) has a fixed offset $t_x$ and a variable offset $\tau_y$, where the difference $\Delta t(B-A)=\tau_B-\tau_A$ is selected initially. For the time-delayed embodiment, or the time-advanced embodiment, the offset $\tau_A$ and/or the offset $\tau_B$, subject to the constraint $\Delta t(B-A)=\tau_B-\tau_A$=constant, is varied to determine the value of $\tau_A$ (or $\tau_B$) for which the difference $\Delta s_{E-L}(t)$, integrated over the time interval $0 \leq t \leq T$, is zero. The value of $\tau_A$ (or $\tau_B$) thus found becomes the tracking point for the incoming signal.

In the apparatus shown in FIG. 26, the dynamic, or time varying selection of W1(t;q) and of W1ˆ(t;q) (=0 here) is performed automatically. If two consecutive digital signal bit values satisfy $b_{n-1}=b_n$ (or $\Delta b_n=0$), Eqs. (25)–(28) and Eqs. (29)–(32) become identically zero for the time interval $I_n$, which effectively insures that W1ˆ(t;q)=0. If $b_{n-1} \neq b_n$ (or $\Delta b_n=1$), Eqs. (25)–(28) and Eqs. (29)–(32) are not identically zero and do provide a non-zero weighting function W1(t;q).

Figure 28:
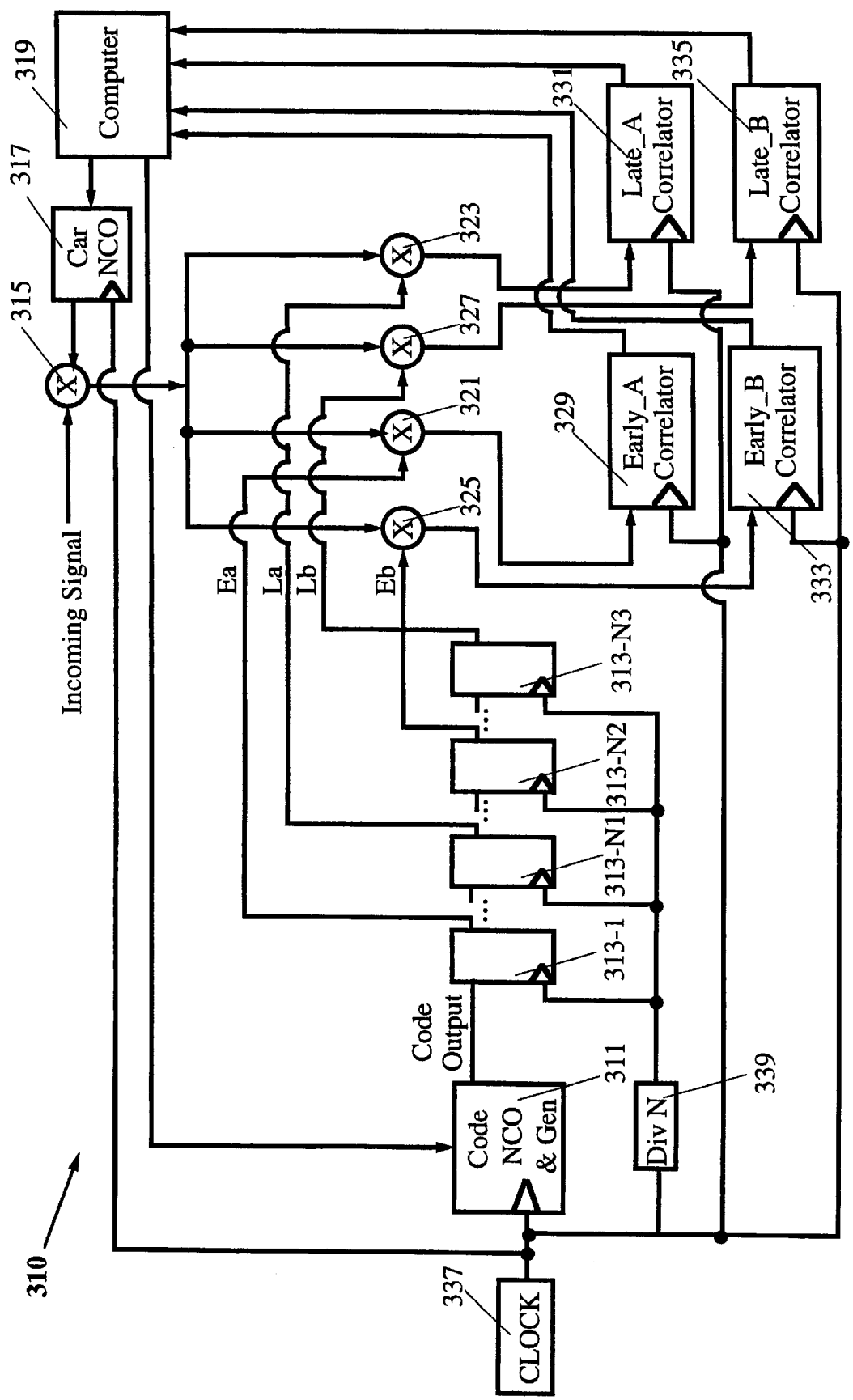
FIG. 28 illustrates another apparatus suitable for implementing a two-consecutive-bit procedure according to the invention.

FIG. 28 illustrates a single channel apparatus 310 that provide similar weighting functions w12(t;x;qx) by combining uniformly weighted autocorrelation function values. This apparatus includes a code phase NCO and generator 311 whose output signal is received by the first of a sequence of D flipflops 313-1, ..., 313-N1, ..., 313-N2, ..., 313-N3, with associated time delay $\Delta t$(clock), where the numbers N1, N2 and N3 are chosen to satisfy (N1-1) $\Delta t$(clock)=$t_{L,A}-t_{E,A}$, (33)

(N2-1) $\Delta t$(clock)=$t_{E,B}-t_{E,A}$, (34)

(N3-1) $\Delta t$(clock)=$t_{L,B}-t_{E,A}$, (35)

with N1>1 and N3>N2, where the subscripts A and B refer to the desired different desired times for an equivalent "A" channel and an equivalent "B" channel. Here, N2 may be less than, equal to or greater than N1. An incoming signal I(t) is received by a first input terminal of a first signal multiplier 315. A second input terminal of the first signal multiplier 315 receives a carrier signal from a carrier phase NCO 317 that is controlled by signals received from a computer 319. The carrier signal mixes with the incoming signal to produce a baseband signal. The output signal from the first signal multiplier 315 is received by first input terminals of second, third, fourth and fifth signal multipliers 321, 323, 325 and 327. Second input terminals of the signal multipliers 321, 323, 325 and 327 receive the output signals from the D flipflops 313-1, 313-N1, 313-N2 and 313-N3, respectively. Output signals from the signal multipliers 321, 323, 325 and 327 are received by a first early signal correlator module 329, a first late signal correlator module 331, a second early signal correlator module 333 and a second late signal correlator module 335, respectively. Output signals from the four early signal and late signal correlator modules 329, 331, 333 and 335 are received by the computer 319 to vary the time shift variable τ that is part of the reference signal $S_d(t+\tau)$ that is produced by the code phase NCO and generator 311. The code phase NCO 311, the D tlipflops 331-y (y=1, ..., N1, ..., N2, ..., N3), the carrier phase NCO 317, and the early signal and late signal correlator modules 329, 331, 333 and 335 are all driven by a master clock 337, with the D flipflop clock signals being optionally passed through a divide-by-N module 339 as shown. The clock pulse width is $\Delta t$(clock).

Computation of the selected reference signals $S_d(t+\tau_y-t_x)$ (x=E,L; y=A,B), of the autocorrelation functions AC0($\tau_y$;x), and of the tracking point for $\tau_A$ (or $\tau_B$) proceeds as in the earlier development for FIG. 26.

The approach developed here is applicable to analysis of any incoming digital signal that has been transmitted using a code division multiple access (CDMA) format, in which the underlying incoming digital signal is a known pseudo-random code and the time of arrival of the direct signal (with multipath signals absent) is unknown. The source of the incoming digital signal may be satellite based or be ground based, with fixed location or variable location relative to the observer. By variably suppressing the contribution of a particular time interval $I_n$ to the autocorrelation difference function $\Delta AC\#(\tau,q)$, depending upon the transitions in bit values at $t=t_n$, at $t=t_{n-1}$, and/or at $t=t_{n-2}$, the contribution of noise and/or multipath signals to a modified autocorrelation difference function $\Delta AC\#(\tau;q)$ can be suppressed.

The phrase "autocorrelation function" is used herein to refer to a sum or integral over a collection of time values of a digital signal product $w(t+\tau;q)s(t)S_d(t+\tau)$, where the digital composite signal s(t) includes the digital direct signal $S_d(t)$ and, possibly, one or more multipath signals $S_m(t;\Delta t_m)$.

We claim:

1. A method of formation of an autocorrelation difference function of an incoming signal that reduces effects of presence of a multipath signal in the incoming signal, the method comprising the steps of:

(1) receiving an incoming digital signal s(t) that can vary with the time t and that has a digital signal bit period with a selected length $\Delta \tau_{chip}$;

(2) forming a first signal product difference $\Delta s_1(t;\tau;t_E;t_L;qE;qL)=s(t)S_d(t+\tau-t_E)w1(t+\tau-t_E;qE)-s(t)S_d(t+\tau-t_L)w1(t+\tau-t_L;qL),$ where $S_d(t)$ is a selected reference signal, w1(t;q) is a first selected, non-constant weighting signal that may depend upon one or more parameters q, τ is a selected time shift, $t_E$ and $t_L$ are first and second selected time values satisfying $0<t_L-t_E<2\Delta \tau_{chip}$;

(3) forming a second signal product difference $\Delta s_2(t;\tau;t_E;t_L;qE;qL)=s(t)S_d(t+\tau-t_E)w1ˆ(t+\tau-t_E;qE)-s(t)S_d(t+\tau-t_L)w1ˆ(t+\tau-t_L;qL),$ where w1ˆ(t;q) is a second selected weighting signal that may depend upon one or more parameters q;

(4) selecting an integer n≧2 and setting an accumulation $A_{n-1}=0$;

(5) examining the incoming digital signal bit value $b_n$, for the time interval defined by $n\Delta \tau_{chip} \leq t<(n+1)\Delta \tau_{chip}$, and the immediately preceding digital bit value $b_{n-1}$ of the reference signal $S_d(t)$;

(6) when $b_{n-1} \neq b_n$, computing the contribution of the first signal product difference over a time interval $I_n=\{t'|t_{n-1}+\Delta<t'\leq t_n+\Delta\}$, where Δ is a selected time value satisfying $0\leq \Delta<\Delta \tau_{chip}$, to an autocorrelation difference function $\Delta AC\#(\tau;q)$ for the incoming digital signal s(t), and adding this contribution to $A_{n-1}$ to form $A_n$;

(7) when $b_{n-1}=b_n$, computing the contribution of the second signal product difference over the time interval $I_n$ to the autocorrelation difference function $\Delta AC\#(\tau;q)$ for the incoming digital signal s(t), and adding this integral or sum to $A_{n-1}$ to form $A_n$;

(8) replacing the integer n by the integer n+1 and repeating steps (5), (6) and (7) at least once;

(9) interpreting the accumulation $A_N$ for a selected positive integer N as the autocorrelation difference function $\Delta AC\#(\tau;q)$ for the incoming digital signal s(t);

(10) determining at least one value $t_0$ of the time shift variable τ for which the autocorretation difference function $\Delta AC\#(\tau;q)$ changes sign; and

(11) interpreting the time value $t=t_0$ as an estimate of the time at which a signal, which is substantially free of the presence of a multipath signal, was received.

2. The method of claim 1, further comprising the step of selecting at least one of said weighting functions w1(t;q) and w1ˆ(t;q) to be a notch function.

3. The method of claim 1, further comprising the step of selecting at least one of said weighting functions w1(t;q) and W1^(t;q) to be an anti-notch function.

4. The method of claim 1, further comprising the step of selecting said weighting function w1^(t;q) to be substantially zero everywhere.

5. A method of formation of an autocorrelation difference function of an incoming signal that reduces effects of presence of a multipath signal in the incoming signal, the method comprising the steps of:

(1) receiving an incoming digital signal s(t) that can vary with the time t and that has a digital signal bit period with a selected length $\Delta\tau_{chip}$;

(2) forming a first signal product difference $$\Delta s_1(t;\tau;t_E;t_L;qE;qL) = s(t)S_d(t+\tau-t_E)w1(t+\tau-t_E;qE) - s(t)S_d(t+\tau-t_L)w1(t+\tau-t_L;qL),$$

where $S_d(t)$ is a selected reference signal, w1(t;q) is a first selected, non-constant weighting signal that may depend upon one or more parameters q, $\tau$ is a selected time shift, $t_E$ and $t_L$ are first and second selected time values satisfying $0 < t_L - t_E < 2\Delta\tau_{chip}$;

(3) forming a second signal product difference $$\Delta s_2(t;\tau;t_E; t_L;qE;qL) = s(t)S_d(t+\tau-t_E)w1^{\wedge}(t+\tau-t_E;qE) - s(t)S_d(t+\tau-t_L)w1^{\wedge}(t+\tau-t_L;qL),$$

where w1^(t;q) is a second selected weighting signal that may depend upon one or more parameters q;

(4) selecting an integer $n \geq 3$ and setting an accumulation $A_{n-1} = 0$;

(5) examining the incoming digital signal bit value $b_n$, for the time interval defined by $n\Delta\tau_{chip} \leq t < (n+1)\Delta\tau_{chip}$, and the two immediately preceding digital bit values $b_{n-1}$ and $b_{n-2}$ of the reference signal $S_d(t)$;

(6) when $b_{n-2} = b_{n-1}$ and $b_{n-1} \neq b_n$, computing the contribution of the first signal product difference over a time interval $I_n = \{t' | t_{n-1} + \Delta < t' \leq t_n + \Delta\}$, where $\Delta$ is a selected time value satisfying $0 \leq \Delta < \Delta\tau_{chip}$, to an autocorrelation difference function $\Delta AC\#(\tau;q)$ for the incoming digital signal s(t), and adding this contribution to $A_{n-1}$ to form $A_n$;

(7) when $b_{n-2} \neq b_{n-1}$ or $b_{n-1} = b_n$, computing the contribution of the second signal product difference over the time interval $I_n$ to the autocorrelation difference function $\Delta AC\#(\tau;q)$ for the incoming digital signal s(t), and adding this integral or sum to $A_{n-1}$ to form $A_n$;

(8) replacing the integer n by the integer n+1 and repeating steps (5), (6) and (7) at least once;

(9) interpreting the accumulation $A_N$ for a selected positive integer N as the autocorrelation difference function $\Delta AC\#(\tau;q)$ for the incoming digital signal s(t); and

(10) determining at least one value $t_0$ of the time shift variable $\tau$ for which the autocorrelation difference function $\Delta AC\#(\tau;q)$ changes sign; and

(11) interpreting the time value $t = t_0$ as an estimate of the time at which a signal, which is substantially free of the presence of a multipath signal, was received.

6. The method of claim 5, further comprising the step of selecting at least one of said weighting functions w1(t;q) and w1^(t;q) to be a notch function.

7. The method of claim 5, further comprising the step of selecting at least one of said weighting functions w1(t;q) and w1^(t;q) to be an anti-notch function.

8. The method of claim 5, further comprising the step of selecting said weighting function w1^(t;q) to be substantially zero everywhere.

9. Apparatus for formation of an autocorrelation difference function of an incoming signal that reduces effects of presence of a multipath signal in the incoming signal, the apparatus comprising:

a signal antenna that receives an incoming digital signal s(t) that can vary with the time t and that has a digital signal bit period with a selected length $\Delta\tau_{chip}$;

a signal receiver/processor, including a computer, that generates a selected digital reference signal $S_d(t)$, that examines a signal bit value $b_n$ and the immediately preceding digital bit value $b_{n-1}$ of the reference signal $S_d(t)$, and that is programmed to:

(1) receive an incoming digital signal s(t) that can vary with the time t and that has a digital signal bit period with a selected length $\Delta t_{chip}$;

(2) form a first signal product difference $$\Delta s_1(t;\tau t_E;t_L;qE;qL) = s(t)S_d(t+\tau-t_E)w1(t+\tau-t_E;qE) - s(t)S_d(t+\tau-t_L)w1(t+\tau-t_L;qL),$$

where w1(t;q) is a first selected, non-constant weighting signal that may depend upon one or more parameters q, $\tau$ is a selected time shift, $t_E$ and $t_L$ are first and second selected time values satisfying $0 < t_L - t_E < 2\Delta\tau_{chip}$;

(3) form a second signal product difference $$\Delta s_2(t;\tau;t_E;t_L;qE;qL) = s(t)S_d(t+\tau-t_E)w1^{\wedge}(t+\tau-t_E;qE) - s(t)S_d(t+\tau-t_L)w1^{\wedge}(t+\tau-t_L;qL),$$

where w1^(t;q) is a second selected weighting signal that may depend upon one or more parameters q;

(4) select an integer $n \geq 2$ and set an accumulation $A_{n-1} = 0$;

(5) examine the bit value $b_n$, for a time interval defined by $n\Delta\tau_{chip} \leq t < (n+1)\Delta\tau_{chip}$, and the immediately preceding bit value $b_{n-1}$ of the reference signal $S_d(t)$;

(6) when $b_{n-1} \neq b_n$, compute the contribution of the first signal product difference over the time interval $I_n = \{t' | t_{n-1} + \Delta < t' \leq t_n + \Delta\}$, where $\Delta$ is a selected time value satisfying $0 \leq \Delta < \Delta\tau_{chip}$ to an autocorrelation difference function $\Delta AC\#(\tau;q)$ for the incoming digital signal s(t), and adding this contribution to $A_{n-1}$ to form $A_n$;

(7) when $b_{n-1} = b_n$, compute the contribution of the second signal product difference over the time interval $I_n$ to the autocorrelation difference function $\Delta AC\#(\tau;q)$ for the incoming digital signal s(t), and adding this integral or sum to $A_{n-1}$ to form $A_n$;

(8) replace the integer n by the integer n+1 and repeat steps (5), (6) and (7) at least once;

(9) interpret the accumulation $A_N$ for a selected positive integer N as the autocorrelation difference function $\Delta AC\#(\tau;q)$ for the incoming digital signal s(t);

(10) determine at least one value $t_0$ of the time shift variable $\tau$ for which the autocorrelation difference function $\Delta AC\#(\tau;q)$ changes sign; and

(11) interpret the time value $t = t_0$ as an estimate of the time at which a signal, which is substantially free of the presence of a multipath signal, was received.

10. The apparatus of claim 9, wherein at least one of said weighting functions w1(t;q) and w1^(t;q) used by said signal receiver/processor to form said signal product is selected to be a notch function.

11. The apparatus of claim 9, wherein at least one of said weighting functions w1(t;q) and w1^(t;q) used by said signal receiver/processor to form said signal product is selected to be an anti-notch function.

12. The apparatus of claim 9, wherein said weighting function w1^(t;q) is selected to be zero everywhere.

13. Apparatus for formation of an autocorrelation difference function of an incoming signal that reduces effects of presence of a multipath signal in the incoming signal, the apparatus comprising:

a signal antenna that receives an incoming digital signal s(t) that can vary with the time t and that has a digital signal bit period with a selected length $\Delta t_{chip}$;

a signal receiver/processor, including a computer, that generates a selected digital reference signal $S_d(t)$, that examines a bit value $b_n$ and the two immediately preceding digital bit values $b_{n-1}$ and $b_{n-2}$ of the reference signal $S_d(t)$, and that is programmed to:

(1) receive an incoming digital signal s(t) that can vary with the time t and that has a digital signal bit period with a selected length $\Delta \tau_{chip}$;

(2) form a first signal product difference $$\Delta s_1(t;\tau;t_E;t_L;qE;qL) = s(t)S_d(t+\tau-t_E)w1(t+\tau-t_E;qE) - s(t)S_d(t+\tau-t_L)w1(t+\tau-t_L;qL),$$

where w1(t;q) is a first selected, non-constant weighting signal that may depend upon one or more parameters q, $\tau$ is a selected time shift, $t_E$ and $t_L$ are first and second selected time values satisfying $0 < t_L - t_E < 2\Delta \tau_{chip}$;

(3) form a second signal product difference $$\Delta s_2(t;\tau;t_E;t_L;qE;qL) = s(t)S_d(t+\tau-t_E)w1^{\wedge}(t+\tau-t_E;qE) - s(t)S_d(t+\tau-t_L)w1^{\wedge}(t+\tau-t_L;qL),$$

where w1'(t;q) is a second selected weighting signal that may depend upon one or more parameters q;

(4) select an integer $n \geq 3$ and set an accumulation $A_{n-1} = 0$;

(5) examine the bit value $b_n$, for the time interval defined by $n\Delta \tau_{chip} \leq t \leq (n+1)\Delta \tau_{chip}$, and the two immediately preceding digital bit values $b_{n-1}$ and $b_{n-2}$ of the reference signal $S_d(t)$;

(6) when $b_{n-2} = b_{n-1}$ and $b_{n-1} \neq b_n$, compute the contribution of the first signal product difference over a time interval $I_n = \{t' | t_{n-1} + \Delta < t' \leq t_n + \Delta\}$, where $\Delta$ is a selected time value satisfying $0 \leq \Delta < \Delta \tau_{chip}$, to an autocorrelation difference function $\Delta AC\#(\tau;q)$ for the incoming digital signal s(t), and adding this contribution to $A_{n-1}$ to form $A_n$;

(7) when $b_{n-2} \neq b_{n-1}$ or $b_{n-1} = b_n$, compute the contribution of the second signal product difference over the time interval $I_n$ to the autocorrelation difference function $\Delta AC\#(\tau;q)$ for the incoming digital signal s(t), and adding this integral or sum to $A_{n-1}$ to form $A_n$;

(8) replace the integer n by the integer n+1 and repeat steps (5), (6) and (7) at least once;

(9) interpret the accumulation $A_N$ for a selected positive integer N as the autocorrelation difference function $\Delta AC\#(\tau;q)$ for the incoming digital signal s(t); and

(10) determine at least one value $t_0$ of the time shift variable T for which the autocorrelation difference function $\Delta AC\#(\tau;q)$ changes sign; and

(11) interpret the time value $t = t_0$ as an estimate of the time at which a signal, which is substantially free of the presence of a multipath signal, was received.

14. The apparatus of claim 13, wherein at least one of said weighting functions w1(t;q) and w1^(t;q) used by said signal receiver/processor to form said signal product is selected to be a notch function.

15. The apparatus of claim 13, wherein at least one of said weighting, functions w1(t;q) and w1^(t;q) used by said signal receiver/processor to form said signal product is selected to be an anti-notch function.

16. The apparatus of claim 13, wherein said weighting function w1^(t;q) is selected to be substantially zero everywhere.

17. A method of formation of an autocorrelation difference function of an incoming signal that reduces effects of presence of a multipath signal in the incoming signal, the method comprising the steps of:

(1) receiving an incoming digital signal s(t) that can vary with the time t and that has a digital signal bit period with a selected length $\Delta \tau_{chip}$;

(2) forming a first signal product difference $$\Delta s_1(t;\tau;t_E;t_L;qE;qL) = s(t)S_d(t+\tau-t_E)w1(t+\tau-t_E;qE) - s(t)S_d(t+\tau-t_L)w1(t+\tau-t_L;qL),$$

where $S_d(t)$ is a selected reference signal, w1(t;q) is a first selected, non-constant weighting signal that may depend upon one or more parameters q and that is periodic with period equal to $\Delta \tau_{chip}$, $\tau$ is a selected time shift, $t_E$ and $t_L$ are first and second selected time values satisfying $0 < t_L - t_E < 2\Delta \tau_{chip}$;

(3) forming a second signal product difference $$\Delta s_2(t;\tau;t_E;t_L;qE;qL) = s(t)S_d(t+\tau-t_E)w1^{\wedge}(t+\tau-t_E;qE) - s(t)S_d(t+\tau-t_L)w1^{\wedge}(t+\tau-t_L;qL),$$

where w1^(t;q;k) is a second selected weighting signal that may depend upon one or more parameters q and that is periodic with period $k\Delta \tau_{chip}$, where k is a selected integer $\geq 2$;

(4) selecting an integer $n \geq 2$ and setting an accumulation $A_{n-1} = 0$;

(5) examining the incoming digital signal bit value $b_n$, for the time interval defined by $n\Delta \tau_{chip} \leq t \leq (n+1)\Delta \tau_{chip}$, and the immediately preceding digital bit value $b_{n-1}$ of the reference signal $S_d(t)$;

(6) when $b_{n-1} \neq b_n$, computing the contribution of the first signal product difference over a time interval $I_n = \{t' | t_{n-1} + \Delta < t' \leq t_n + \Delta\}$, where $\Delta$ is a selected time value satisfying $0 \leq \Delta < \Delta \tau_{chip}$, to an autocorrelation difference function $\Delta AC\#(\tau;q)$ for the incoming digital signal s(t), and adding this contribution to $A_{n-1}$ to form $A_n$;

(7) when $b_{n-1} = b_n$, computing the contribution of the second signal product difference over the time interval $I_n$ to an autocorrelation difference function $\Delta AC\#(\tau;q)$ for the incoming digital signal s(t), and adding this integral or sum to $A_{n-1}$ to form $A_n$;

(8) replacing the integer n by the integer n+1 and repeating steps (5), (6) and (7) at least once;

(9) interpreting the accumulation $A_N$ for a selected positive integer N as an autocorrelation difference function $\Delta AC\#(\tau;q)$ for the incoming digital signal s(t);

(10) determining at least one value $t_0$ of the time shift variable $\tau$ for which the autocorrelation difference function $\Delta AC\#(\tau;q)$ changes sign; and

(11) interpreting the time value $t = t_0$ as an estimate of the time at which a signal, that is substantially free of the presence of a multipath signal, was received.

18. A method of formation of an autocorrelation difference function of an incoming signal that reduces effects of presence of a multipath signal in the incoming signal, the method comprising the steps of:

(1) receiving an incoming digital signal s(t) that can vary with the time t and that has a digital signal bit period with a selected length $\Delta \tau_{chip}$;

(2) forming a first signal product difference $$\Delta s_1(t;\tau;t_E;t_L;qE;qL)=s(t)S_d(t+\tau-t_E)w1(t+\tau-t_E;qE)-s(t)S_d(t+\tau-t_L)w1(t+\tau-t_L;qL),$$

where $S_d(t)$ is a selected reference signal, $w1(t;q)$ is a first selected, non-constant weighting signal that may depend upon one or more parameters q and that is periodic with period equal to $\Delta\tau_{chip}$, $\tau$ is a selected time shift, $t_E$ and $t_L$ are first and second selected time values satisfying $0<t_L-t_E<2\Delta\tau_{chip}$;

(3) forming a second signal product difference $$\Delta s_2(t;\tau;t_E;t_L;qE;qL)=s(t)S_d(t+\tau-t_E)w1\hat{}(t+\tau-t_E)-s(t)S_d(t+\tau-t_L)w1\hat{}(t+\tau-t_L;qL),$$

where $w1\hat{}(t;q;k)$ is a second selected weighting signal that may depend upon one or more parameters q and that is periodic with period $k\Delta\tau$hd chip, where k is a selected integer$\geq 2$;

(4) selecting an integer $n\geq 3$ and setting an accumulation $A_{n-1}=0$;

(5) examining the bit value $b_n$, for the time interval defined by $n\Delta\tau_{chip}\leq t\leq(n+1)\Delta\tau_{chip}$, and the two immediately preceding digital bit values $b_{n-1}$ and $b_{n-2}$ of the reference signal $S_d(t)$;

(6) when $b_{n-2}=b_{n-1}$ and $b_{n-1}\neq b_n$, computing the contribution of the first signal product difference over a time interval $I_n=\{t'|t_{n-1}+\Delta<t'\leq t_n+\Delta\}$, where $\Delta$ is a selected time value satisfying $0\leq\Delta<\Delta\tau_{chip}$, to an autocorrelation difference function $\Delta AC\#(\tau;q)$ for the incoming digital signal s(t), and adding this contribution to $A_{n-1}$ to form $A_n$;

(7) when $b_{n-2}\neq b_{n-1}$ or $b_{n-1}=b_n$, computing the contribution of the second signal product difference over the time interval $I_n$ to the autocorrelation difference function $\Delta AC\#(\tau;q)$ for the incoming digital signal s(t), and adding this integral or sum to $A_{n-1}$ to form $A_n$;

(8) replacing the integer n by the integer n+1 and repeating steps (5), (6) and (7) at least once;

(9) interpreting the accumulation $A_N$ for a selected positive integer N as the autocorrelation difference function $\Delta AC\#(\tau;q)$ for the incoming digital signal s(t); and

(10) determining at least one value $t_0$ of the time shift variable $\tau$ for which the autocorrelation difference function $\Delta AC\#(\tau;q)$ changes sign; and

(11) interpreting the time value $t=t_0$ as an estimate of the time at which a signal, that is substantially free of the presence of a multipath signal, was received.

\* \* \* \* \*